United States Patent
Vonarburg et al.

(10) Patent No.: US 9,552,433 B2
(45) Date of Patent: Jan. 24, 2017

(54) GENERIC CONTENT COLLECTION SYSTEMS

(71) Applicant: ORACLE INTERNATIONAL CORPORATION, Redwood Shores, CA (US)

(72) Inventors: Dominique Vonarburg, Belle Mead, NJ (US); William D. Hare, Princeton, NJ (US)

(73) Assignee: ORACLE INTERNATIONAL CORPORATION, Redwood Shores ( * ) Notice: Subject to any disclaimer, the term of this patent is extended or adjusted under 35 U.S.C. 154(b) by 0 days.

(21) Appl. No.: 14/517,251

(22) Filed: Oct. 17, 2014

(65) Prior Publication Data
US 2015/0142582 A1    May 21, 2015

Related U.S. Application Data

(63) Continuation of application No. 11/774,470, filed on Jul. 6, 2007, now Pat. No. 8,869,066.
(Continued)

(51) Int. Cl.
*G06F 15/00* (2006.01)
*G06F 13/00* (2006.01)
(Continued)

(52) U.S. Cl.
CPC ..... *G06F 17/30876* (2013.01); *G06F 3/04842* (2013.01); *G06F 17/30861* (2013.01);
(Continued)

(58) Field of Classification Search
CPC ............................................... G06F 17/30884
(Continued)

(56) References Cited

U.S. PATENT DOCUMENTS 5,230,072 A    7/1993    Smith et al.
5,261,002 A    11/1993    Perlman et al.
(Continued)

FOREIGN PATENT DOCUMENTS

EP    0 996 058 A1    10/1998
EP    1 942 422 A1    7/2008
(Continued)

OTHER PUBLICATIONS

Get the Button!, dated May 6, 2007 by web.archive.org, originally retrieved from the Internet on May 10, 2011, http://replay.web.archive.org/20070506 13223/http://sharethis.com/download.
(Continued)

*Primary Examiner* — Kevin Nguyen
(74) *Attorney, Agent, or Firm* — Vista IP Law Group, LLP

(57) ABSTRACT

The invention generally relates to a universal, generic content collection method and system for collecting, storing, and sharing content on the Internet using computers, mobile and/or electronic devices. In one aspect, the invention relates to methods and systems for collecting multiple types of content using a user interface. The method includes activating the user interface associated with the content, wherein the user interface is configurable to be associated with at least two types of content; optionally, providing a list of one or more content collections services, wherein a first content collection service is configured to collect a first type of content and a second content collection service is configured to collect a second type of content; and directing the content to one or more content collection services. The user interface may be a virtual button on a webpage, browser or other screen device, or a physical button on a piece of hardware such as a PDA, mobile phone, watch, etc.

30 Claims, 9 Drawing Sheets

Related U.S. Application Data

(60) Provisional application No. 60/806,725, filed on Jul. 6, 2006, provisional application No. 60/864,162, filed on Nov. 3, 2006.

(51) Int. Cl.
  *G06F 17/30*      (2006.01)
  *H04L 29/08*      (2006.01)
  *G06F 3/0484*     (2013.01)
  *G06Q 30/02*      (2012.01)

(52) U.S. Cl.
  CPC ......... *G06Q 30/0269* (2013.01); *H04L 67/02* (2013.01); *H04L 67/36* (2013.01)

(58) Field of Classification Search
  USPC ....... 715/812, 847, 702, 776, 744, 760, 862, 715/764
  See application file for complete search history.

(56) References Cited

U.S. PATENT DOCUMENTS

| | | |
|---|---|---|
| 5,675,510 A | 10/1997 | Coffey et al. |
| 5,781,189 A | 7/1998 | Holleran et al. |
| 5,796,952 A | 8/1998 | Davis et al. |
| 5,857,102 A | 1/1999 | McChesney et al. |
| 5,862,377 A | 1/1999 | Lee |
| 5,892,900 A | 4/1999 | Ginter et al. |
| 5,896,532 A | 4/1999 | Blewett |
| 5,951,643 A | 9/1999 | Shelton et al. |
| 6,064,980 A | 5/2000 | Jacobi et al. |
| 6,100,890 A | 8/2000 | Bates et al. |
| 6,108,637 A | 8/2000 | Blumenau |
| 6,112,238 A | 8/2000 | Boyd et al. |
| 6,125,388 A | 9/2000 | Reisman |
| 6,233,601 B1 | 5/2001 | Walsh |
| 6,233,684 B1 | 5/2001 | Stefik et al. |
| 6,236,971 B1 | 5/2001 | Stefik et al. |
| 6,266,649 B1 | 7/2001 | Linden et al. |
| 6,269,361 B1 | 7/2001 | Davis et al. |
| 6,311,194 B1 | 10/2001 | Sheth et al. |
| 6,314,448 B1 | 11/2001 | Conner et al. |
| 6,317,787 B1 | 11/2001 | Boyd et al. |
| 6,360,261 B1 | 3/2002 | Boyd et al. |
| 6,374,252 B1 | 4/2002 | Althoff et al. |
| 6,466,974 B1 | 10/2002 | Nelson et al. |
| 6,546,393 B1 * | 4/2003 | Khan |
| 6,658,568 B1 | 12/2003 | Ginter et al. |
| 6,665,867 B1 | 12/2003 | Ims et al. |
| 6,701,521 B1 | 3/2004 | McLlroy et al. |
| 6,748,555 B1 | 6/2004 | Teegan et al. |
| 6,772,180 B1 | 8/2004 | Li et al. |
| 6,810,356 B1 | 10/2004 | Garcia-Franco et al. |
| 6,857,124 B1 | 2/2005 | Doyle |
| 6,970,853 B2 | 11/2005 | Schutzer |
| 6,985,905 B2 | 1/2006 | Prompt et al. |
| 6,985,929 B1 | 1/2006 | Wilson et al. |
| 6,986,049 B2 | 1/2006 | Delany |
| 7,003,522 B1 | 2/2006 | Reynar et al. |
| 7,003,565 B2 | 2/2006 | Hind et al. |
| 7,016,960 B2 | 3/2006 | Howard et al. |
| 7,024,392 B2 | 4/2006 | Stefik et al. |
| 7,031,932 B1 | 4/2006 | Lipsky et al. |
| 7,035,943 B2 | 4/2006 | Yamane et al. |
| 7,039,599 B2 | 5/2006 | Merriman et al. |
| 7,046,995 B2 | 5/2006 | Rygaard |
| 7,054,900 B1 | 5/2006 | Goldston |
| 7,062,500 B1 | 6/2006 | Hall et al. |
| 7,062,540 B2 | 6/2006 | Reddy et al. |
| 7,062,561 B1 | 6/2006 | Reisman |
| 7,072,672 B1 | 7/2006 | Vanska et al. |
| 7,076,521 B2 | 7/2006 | Davison |
| 7,080,159 B2 | 7/2006 | Chu et al. |
| 7,085,682 B1 | 8/2006 | Heller et al. |
| 7,089,237 B2 | 8/2006 | Turnbull et al. |
| 7,099,926 B1 | 8/2006 | Ims et al. |
| 7,100,054 B2 | 8/2006 | Wenisch et al. |
| 7,103,912 B2 | 9/2006 | Xia et al. |
| 7,117,250 B1 | 10/2006 | Wu |
| 7,117,535 B1 | 10/2006 | Wecker |
| 7,130,964 B2 | 10/2006 | Ims et al. |
| 7,133,846 B1 | 11/2006 | Ginter et al. |
| 7,159,116 B2 | 1/2007 | Moskowitz |
| 7,263,551 B2 | 8/2007 | Belfiore et al. |
| 7,269,792 B2 | 9/2007 | Consolatti et al. |
| 7,346,909 B1 | 3/2008 | Eldar et al. |
| 7,392,395 B2 | 6/2008 | Ginter et al. |
| 7,392,483 B2 | 6/2008 | Wong et al. |
| 7,702,675 B1 | 4/2010 | Khosla et al. |
| 7,730,082 B2 | 6/2010 | Sah et al. |
| 7,735,117 B2 | 6/2010 | Nadalin et al. |
| 8,056,092 B2 | 11/2011 | Allen et al. |
| 8,150,939 B1 | 4/2012 | Murray |
| 8,209,378 B2 | 6/2012 | Allen et al. |
| 8,266,274 B2 | 9/2012 | Allen et al. |
| 8,869,066 B2 | 10/2014 | Vonarburg et al. |
| 9,104,294 B2 | 8/2015 | Forstall et al. |
| 2002/0040314 A1 | 4/2002 | Tolson |
| 2002/0040394 A1 | 4/2002 | Shapira |
| 2002/0072965 A1 | 6/2002 | Merriman et al. |
| 2002/0082914 A1 | 6/2002 | Beyda et al. |
| 2002/0082923 A1 | 6/2002 | Merriman et al. |
| 2002/0082997 A1 | 6/2002 | Kobata et al. |
| 2002/0083188 A1 | 6/2002 | Hericy et al. |
| 2002/0095336 A1 | 7/2002 | Trifon et al. |
| 2002/0099600 A1 | 7/2002 | Merriman et al. |
| 2002/0120673 A1 | 8/2002 | Tolson et al. |
| 2002/0129092 A1 | 9/2002 | Tolson et al. |
| 2002/0174200 A1 | 11/2002 | Kozina |
| 2003/0014483 A1 | 1/2003 | Stevenson et al. |
| 2003/0028433 A1 | 2/2003 | Merriman et al. |
| 2003/0033403 A1 | 2/2003 | Rhodes |
| 2003/0058277 A1 | 3/2003 | Bowman-Amuah |
| 2003/0061482 A1 | 3/2003 | Emmerichs |
| 2003/0070061 A1 | 4/2003 | Wong et al. |
| 2003/0105882 A1 | 6/2003 | Ali et al. |
| 2003/0196121 A1 | 10/2003 | Raley et al. |
| 2003/0200145 A1 | 10/2003 | Krassner et al. |
| 2004/0073755 A1 | 4/2004 | Webb et al. |
| 2004/0098349 A1 | 5/2004 | Tolson |
| 2004/0107125 A1 | 6/2004 | Guheen et al. |
| 2004/0143667 A1 | 7/2004 | Jerome |
| 2004/0153973 A1 | 8/2004 | Horwitz |
| 2004/0165007 A1 | 8/2004 | Shafron |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0215509 A1 | 10/2004 | Perry |
| 2004/0215515 A1 | 10/2004 | Perry |
| 2004/0215709 A1 | 10/2004 | Basani et al. |
| 2004/0225562 A1 | 11/2004 | Turner |
| 2004/0225566 A1 | 11/2004 | Beyda et al. |
| 2004/0225668 A1 | 11/2004 | Teegan et al. |
| 2005/0021611 A1 | 1/2005 | Knapp et al. |
| 2005/0038702 A1 | 2/2005 | Merriman et al. |
| 2005/0050301 A1 | 3/2005 | Whittle et al. |
| 2005/0055458 A1 | 3/2005 | Mohan et al. |
| 2005/0086587 A1 | 4/2005 | Balz |
| 2005/0114774 A1 | 5/2005 | Berryman |
| 2005/0125528 A1 | 6/2005 | Burke, II et al. |
| 2005/0190994 A1 | 9/2005 | Yamanaka |
| 2005/0197991 A1 | 9/2005 | Wray et al. |
| 2005/0198105 A1 | 9/2005 | Schmitz et al. |
| 2005/0198201 A1 | 9/2005 | Bohn et al. |
| 2005/0210000 A1 | 9/2005 | Michard |
| 2005/0228863 A1 | 10/2005 | Palmeri et al. |
| 2005/0234884 A1 | 10/2005 | Drukman et al. |
| 2005/0246262 A1 | 11/2005 | Aggarwal et al. |
| 2005/0251805 A1 | 11/2005 | Bamba et al. |
| 2005/0256819 A1 | 11/2005 | Tibbs et al. |
| 2005/0256954 A1 | 11/2005 | Shapira et al. |
| 2006/0004703 A1 | 1/2006 | Spivack et al. |
| 2006/0015406 A1 | 1/2006 | Beyda et al. |

(56) References Cited

U.S. PATENT DOCUMENTS

| | | |
|---|---|---|
| 2006/0040426 A1 | 2/2006 | Antesberger et al. |
| 2006/0048225 A1 | 3/2006 | Gomez et al. |
| 2006/0088044 A1 | 4/2006 | Hammerl |
| 2006/0089880 A1 | 4/2006 | Merriman et al. |
| 2006/0106876 A1 | 5/2006 | MacGregor |
| 2006/0112102 A1 | 5/2006 | Shafron |
| 2006/0112341 A1 | 5/2006 | Shafron |
| 2006/0129937 A1 | 6/2006 | Shafron |
| 2006/0136843 A1 | 6/2006 | Shafron |
| 2006/0161513 A1 | 7/2006 | Drumm et al. |
| 2006/0178918 A1 | 8/2006 | Mikurak |
| 2006/0190290 A1 | 8/2006 | Gomez |
| 2006/0212589 A1 | 9/2006 | Hayer et al. |
| 2006/0218036 A1 | 9/2006 | King et al. |
| 2006/0242379 A1 | 10/2006 | Korgaonkar et al. |
| 2006/0259462 A1* | 11/2006 | Timmons .......................... 707/3 |
| 2006/0277457 A1 | 12/2006 | Salkind et al. |
| 2007/0038934 A1 | 2/2007 | Fellman |
| 2007/0078777 A1 | 4/2007 | Demartini et al. |
| 2007/0078953 A1 | 4/2007 | Chai et al. |
| 2007/0101146 A1 | 5/2007 | Louch et al. |
| 2007/0101291 A1 | 5/2007 | Forstall et al. |
| 2007/0101297 A1 | 5/2007 | Forstall et al. |
| 2007/0106759 A1 | 5/2007 | Willie et al. |
| 2007/0112676 A1 | 5/2007 | Kontio et al. |
| 2007/0130541 A1 | 6/2007 | Louch et al. |
| 2007/0192329 A1 | 8/2007 | Croft et al. |
| 2007/0192339 A1 | 8/2007 | Baker et al. |
| 2007/0209013 A1 | 9/2007 | Ramsey et al. |
| 2007/0250618 A1 | 10/2007 | Hammond |
| 2007/0266093 A1 | 11/2007 | Forstall et al. |
| 2007/0288518 A1 | 12/2007 | Crigler et al. |
| 2007/0288858 A1 | 12/2007 | Pereira et al. |
| 2008/0010133 A1 | 1/2008 | Pyhalammi et al. |
| 2008/0010319 A1 | 1/2008 | Vonarburg et al. |
| 2008/0028294 A1 | 1/2008 | Sell et al. |
| 2008/0034040 A1 | 2/2008 | Wherry et al. |
| 2008/0034314 A1 | 2/2008 | Louch et al. |
| 2008/0040426 A1 | 2/2008 | Synstelien et al. |
| 2008/0040681 A1 | 2/2008 | Synstelien et al. |
| 2008/0071883 A1 | 3/2008 | Alterman |
| 2008/0082627 A1 | 4/2008 | Allen et al. |
| 2008/0091777 A1 | 4/2008 | Carlos |
| 2008/0097871 A1 | 4/2008 | Williams et al. |
| 2008/0104496 A1 | 5/2008 | Williams et al. |
| 2008/0140775 A1 | 6/2008 | Lee et al. |
| 2008/0141141 A1 | 6/2008 | Moore et al. |
| 2008/0141153 A1 | 6/2008 | Samson et al. |
| 2008/0148283 A1 | 6/2008 | Allen et al. |
| 2008/0168245 A1 | 7/2008 | De Atley et al. |
| 2008/0168363 A1 | 7/2008 | Bertram |
| 2008/0168391 A1 | 7/2008 | Robbin et al. |
| 2008/0215879 A1 | 9/2008 | Williams et al. |
| 2008/0215998 A1 | 9/2008 | Moore et al. |
| 2008/0222232 A1 | 9/2008 | Allen et al. |
| 2008/0222295 A1 | 9/2008 | Robinson et al. |
| 2008/0222613 A1 | 9/2008 | Allen et al. |
| 2008/0222658 A1 | 9/2008 | Allen et al. |
| 2008/0232560 A1 | 9/2008 | Sirkin |
| 2008/0255962 A1 | 10/2008 | Chang et al. |
| 2008/0319856 A1 | 12/2008 | Zito et al. |
| 2009/0013058 A1 | 1/2009 | Chan |
| 2009/0024943 A1 | 1/2009 | Adler et al. |
| 2009/0037509 A1 | 2/2009 | Parekh et al. |
| 2009/0070409 A1 | 3/2009 | Clayton et al. |
| 2009/0094339 A1 | 4/2009 | Allen et al. |
| 2009/0111448 A1 | 4/2009 | Paila |
| 2009/0144429 A1 | 6/2009 | Astrom |
| 2009/0180412 A1 | 7/2009 | Albert et al. |
| 2009/0204885 A1 | 8/2009 | Ellsworth et al. |
| 2009/0216634 A1 | 8/2009 | Peltonen et al. |
| 2009/0265213 A1 | 10/2009 | Hyman et al. |
| 2009/0288004 A1 | 11/2009 | Strandell et al. |
| 2010/0030901 A1 | 2/2010 | Hallberg et al. |
| 2010/0100605 A1 | 4/2010 | Allen et al. |
| 2010/0100626 A1 | 4/2010 | Allen et al. |
| 2010/0138295 A1 | 6/2010 | Caron et al. |
| 2011/0099487 A1 | 4/2011 | Pyhalammi |
| 2012/0227060 A1 | 9/2012 | Allen et al. |

FOREIGN PATENT DOCUMENTS

| | | |
|---|---|---|
| JP | 2005-346434 A | 12/2005 |
| WO | WO 01/86384 A2 | 11/2001 |
| WO | WO 02/21404 A1 | 3/2002 |
| WO | WO 2006/028488 A2 | 3/2006 |
| WO | WO 2008/052013 A2 | 5/2008 |
| WO | WO 2008/060828 A2 | 5/2008 |

OTHER PUBLICATIONS

About Us, dated Apr. 30, 2007 by web.archive.org, originally retrieved from the Internet on May 10, 2011, http://replay.web.archive.org/200704300165058/http://sharethis.com/about.

Quick Sharing to MySpace, Email, and More!, dated May 3, 2007 by vveb.archive.org, originally retrieved from the internet on May 10, 2011, http://replay.web.archive.org/20070503171135/http://sharethis.com.

Final Office Action issued Nov. 5, 2010 in U.S. Appl. No. 11/774,470, filed Jul. 6, 2007.

Nonfinal Office Action issued May 21, 2010 in U.S. Appl. No. 11/774,470, filed Jul. 6, 2007.

Non-final Office Action dated Dec. 17, 2015 for related U.S. Appl. No. 14/684,591.

Notice of Allowance and Fee(s) due dated Jul. 1, 2016 for related U.S. Appl. No. 14/684,591.

Office Action for U.S. Appl. No. 11/537,362, mailed Jul. 8, 2010.

Office Action for U.S. Appl. No. 11/537,362, mailed Dec. 10, 2009.

Supplementary European Search Report for European Patent Application No. 0784 3 614.4, mailed Aug. 30, 2010, 3 pages.

Office Action for U.S. Appl. No. 11/537,375, mailed Jul. 7, 2010.

Office Action for U.S. Appl. No. 11/537,375, mailed Feb. 16, 2011.

Office Action for U.S. Appl. No. 11/537,375, mailed Apr. 9, 2013.

International Search Report and Written Opinion for International Application No. PCT/US07/80086, mailed Apr. 18, 2008, 9 pages.

Office Action for U.S. Appl. No. 11/682,626, mailed Jul. 8, 2010.

Office Action for U.S. Appl. No. 11/682,626, mailed Jan. 11, 2010.

Office Action for U.S. Appl. No. 11/682,626, mailed Jun. 18, 2009.

International Search Report and Written Opinion for International Application No. PCT/US08/55755, mailed Jul. 25, 2008, 8 pages.

Office Action for U.S. Appl. No. 11/682,639, mailed Sep. 1, 2010.

Office Action for U.S. Appl. No. 11/682,639, mailed Apr. 13, 2011.

Office Action for U.S. Appl. No. 11/682,639, mailed Mar. 12, 2014.

International Search Report and Written Opinion for International Application No. PCT/US08/55756, mailed Aug. 1, 2008, 7 pages.

Office Action for U.S. Appl. No. 12/043,805, mailed Jan. 21, 2011.

Office Action for U.S. Appl. No. 12/043,805, mailed Dec. 8, 2010.

Office Action for U.S. Appl. No. 12/043,805, mailed Jun. 24, 2010.

Office Action for U.S. Appl. No. 12/043,805, mailed Sep. 2, 2011.

International Search Report and Written Opinion for International Application No. PCT/US08/56073, mailed Aug. 8, 2008, 8 pages.

Office Action for U.S. Appl. No. 12/244,606, mailed Jun. 22, 2010.

Office Action for U.S. Appl. No. 12/244,606, mailed Mar. 16, 2011.

International Search Report and Written Opinion for International Application No. PCT/US08/78744, mailed Jan. 12, 2009, 9 pages.

Office Action for U.S. Appl. No. 12/560,127, mailed Jun. 13, 2011.

Office Action for U.S. Appl. No. 12/560,159, mailed Jun. 13, 2011.

Office Action for U.S. Appl. No. 12/560,159, mailed Apr. 25, 2012.

Office Action for U.S. Appl. No. 11/774,470, mailed Nov. 5, 2010.

Office Action for U.S. Appl. No. 11/774,470, mailed May 21, 2010.

"Amulet Technologies, Inter-Widget Communication, 2004 http://web.mit.edu/6.115/www/miscfiles/amulet/amulethelp/1WC.htm".

Daily Flash Performance Report :: MochiBot.com Traffic Report Tour [online], [retrieved on Jan. 11, 2006]. Retrieved from the Internet: <URL: http://www.mochibot.com/tourtrafficreport.html>. (2 pgs).

(56) References Cited

OTHER PUBLICATIONS

Flash Traffic Analysis for a SWF :: MochiBot.com SWF Detail Tour [online], [retrieved on Jan. 11, 2006] the Internet: <URL: http://www.mochibot.com/tour swfdetail.html>. (2 pages).

Goland et al., Simple Service Discovery Protocol, <draft-cai-ssdp-v1-03.txt>, Oct. 28, 1999.

Klinker, G., Augmented Reality II—Context Toolkit, May 27, 2003.

Liscano et al., Context Awareness and Service Discovery for Spontaneous Networking, School of Information Technology and Engineering (SITE), University of Ottawa, Ottawa, Ontario (2003).

Luyten, K. et al., Uiml.net: an Open Uimi Renderer for the .Net Framework, in R. Jacob, Q. Lim bourg, J. Vanderdonckt (eds.), Proc. of 5th Int. Conf. of Computer-Aided Design of User Interfaces CADUI'2004. Jan. 2004. Infonnation Systems Series, Kluwer Academics, Dordrecht, 2005, pp. 259-270. [retrieved from the internet Jun. 15, 2010].

MochiBot, "It's 3a.m. Do you know where your Flash content is?", Flash tracking, Traffic Monitoring, and Analytics Service [online], [retrieved on Jan. 11, 2006]. Retrieved from the Internet: <URL: MochiBot.com, http://www.mochibot.com>. (4 pgs).

Overview of the SWFs you are tracking:: MochiBot.com Dasboard Tour [online], [retrieved on Jan. 11, 2006]. Retrieved from the Internet: <URL: http://www.mochibot.com/tour dashboard.html>. (2 pgs).

"Ryu et al., Widget Integration Framework for Context-Aware Middleware, MATA 2005, LNCS 3744, Springer-Verlag, 2005, pp. 161-171".

Salber, D. et al., "The context toolkit: aiding the development of context-enabled applications", Proceedings of the SIGCHI conference on Human factors in computing systems: the CHI is the limit, p. 434-441, May 15-20, 1999 [retrieved from the ACM database on Jun. 15, 2010].

"Schulte, Window Programming in Mozart, (Jan. 25, 2003) http://graubart.rz.ifi.lmu.de/programming/mozart/print/tutorial/WindowProgramming.pdf".

See who's hosting your SWF :: MochiBot.com Host Report Tour [online], [retrieved on Jan. 11, 2006]. Retrieved from the Internet: <URL: http://www.mochibot.com/tourhostreport.htrnl>. (2 pgs).

Snipperoo Web Widgets, Snipperoo Universal Widget [online], [retrieved on Jan. 11, 2006]. Retrieved from the Internet: <URL: http://www.snipperoo.com/>. (1 pg).

Tody, D. "A portable GUI Development System—The IRAF Widget Server, Astronomical Data Analysis Software and Systems IV; ASP Conference Series, vol. 77, 1995 [retrieved from the Internet "http://articles.adsabs.harvard.edu/cgibinlnph-iarticlequery?1995ASPC ... 77. .. 89T &defaultprint=YES &filetype=.pdf" on Jun. 15, 2010].

Wang et al., Grid-based Collaboration in Interactive Data Language Applications, in: Proceedings of the International Conference on Information Technology: Coding and Computing, IEEE (2005).

Widgetbox, Widgetizing the Web [online], [retrieved on Jan. 11, 2006]. Retrieved from the Internet: <URL: http://widgetbox.com> (3 pgs).

* cited by examiner

GENERIC CONTENT COLLECTION SYSTEMS

RELATED APPLICATIONS

This application is a continuation of U.S. patent application Ser. No. 11/774,470, filed Jul. 6, 2007, and titled "Generic Content Collection Systems," now U.S. Pat. No. 8,869,066, which claims priority under 35 USC 119(e)(1) to U.S. provisional patent application No. 60/806,725, filed on Jul. 6, 2006, and titled "Generic Content Collection System," and to U.S. provisional patent application No. 60/864,162 filed on Nov. 3, 2006, and titled "Generic Content Collection System," the content of each of which is incorporated herein by reference in its entirety.

TECHNICAL FIELD

The field of the invention generally relates to a universal, generic content collection system for collecting, storing, and sharing content on the Internet using computers, mobile and/or electronic devices.

BACKGROUND

The Internet contains many types of content that users may wish to collect and share. In response to this desire, services have developed to enable users to collect and share particular types of content. For example, for bookmarks, services such as del.icio.us and Google Bookmarks allow users to easily capture and store bookmarks. Similarly, services are available to capture feeds. For example, Bloglines, MyYahoo, Google Reader, and others provide services to capture and store feeds. However, each service is configured to capture only one type of content. Thus, a user would choose between numerous bookmark services displayed on a page in the form of user interfaces (e.g., buttons on a screen or webpage) and select one from the list displayed to bookmark that page, for example, using the del.icio.us button or user interface for collecting bookmarks. The user however may later accidentally use a different service for collecting bookmarks and file similar content in different services thereby adding complexity and obstacles in retrieving the information. Similar complexities and obstacles exist for other content types.

The web publisher has a limited area on the screen to provide these various content collection buttons or user interfaces and must choose which to include and exclude as well as how to fit them on the web page along with the content. Too many buttons use valuable screen space for displaying buttons rather than for displaying the content of the web publisher. This does not benefit either the web publisher or the user.

FIG. 1 provides a diagram illustrating the relationship between content type on the Internet, content collection buttons or user interfaces, content collection services, and content destination using a current bookmarking service 5. Content 7 displayed on the Internet may have one or more bookmarking buttons (i.e., user interfaces) 10a, 10b, 10c, 10d, .... 10n associated with it. Examples of bookmarking buttons associated with content include buttons from del.icio.us, Google bookmarks, Digg, etc. Pressing, clicking, or otherwise activating the button causes the content associated with the button or interface to be sent to its corresponding bookmarking service 15a, 15b, 15c, 15d, ... 15n. Thus, pressing the del.icio.us bookmark button 10a will cause content to be sent to the del.icio.us bookmarking service 15a, just as clicking the google bookmark button 10b and the Digg button 10c will cause content to be sent the corresponding bookmarking service 15b and 15c, respectively. In particular, the content will go to the specific bookmarking service and at that service it will go to the account of the user who has activated the button on the specific bookmarking service. The content will neither go to another service nor to multiple service simultaneously. As a consequence a user is reliant upon the web publisher to include the bookmark service buttons 10 on the page. The web publisher may select one, two or more of the buttons but leave off other buttons. As a consequence, the user is inconvenienced by the need to set up multiple bookmark accounts with the various services in order to be capable of bookmarking from any web page.

It should be noted that the bookmarking example of FIG. 1 operates similarly to other current content collection methods. For example, there are numerous feed services with feed service buttons for collecting feed content. Activating one of the feed service buttons will send the feed to that corresponding feed service. Similar configurations exist for podcast services, wish list services, etc. In general a content collection service will have a button on a web page and activating that button will send content to that service.

In summary, the prior art content collection methods generally relate to collecting content using a button or user interface in which the method includes activating a user interface associated with one type of content. Activating the user interface directs the content to a content collection service.

In contrast, one invention described herein includes a method and user interface or button that provides the ability to use a single interface or button that is configurable to collect digital content without being limited by the type of digital content collected. Another invention described herein includes a method and user interface or button that provides the ability to use a single interface or button that is configurable to collect digital content without being limited by the collection service for the particular type of digital content collected. It should be noted that in general the user interface and button are used interchangeable herein to describe a button that a user can press or otherwise activate to collect content.

SUMMARY

In one general aspect, there is provided a method for collecting multiple types of content using a user interface. The method includes:

activating the user interface associated with the content, wherein the user interface is configurable to be associated with at least two types of content;

optionally, providing a list of one or more content collections services, wherein a first content collection service is configured to collect a first type of content and a second content collection service is configured to collect a second type of content; and directing the content to one or more content collection services.

Embodiments of the method may include one or more of the following features. For example, the user interface may include one or more of a browser button, a button displayed on a webpage, and a button on a mobile device. The mobile device may include one or more of a cell phone, PDA, camera, and watch.

The content may include one or more of bookmarks, RSS feeds, podcasts, products, advertisements, contacts, events, images, videos, ads, classifieds, documents, and snippets of information.

The content may be displayed on a web page and the user interface is displayed on the webpage. The method may further include additional user interfaces displayed on the webpage. The additional user interfaces may be associated with content of a different type than the first type of content.

The method may further include setting a default content collection service for the content, whereby subsequently activating a user interface associated with a second content directs the content to the default content collection service, the second content type being the same content type as the first content. Subsequently activating the user interface associated with the second content may direct the content to the default content collection service without presenting an option of selecting a content collection service.

The content collected may be stored in a database separate from the content collection service. The data collected may be used for determining advertisements to be displayed to a user. The data collected may be used for creating a profile of the user of the user interface. The data collected may be used for inventory management purposes.

In another general aspect there is provided a system for collecting multiple types of content using a user interface. The system may include:

a means for displaying a user interface associated with the content, wherein the user interface is configurable to be associated with at least two types of content;

a means for processing data created by activating the user interface to direct the content to one or more content collection services; and an optional display of a list of one or more content collections services, wherein a first content collection service is configured to collect a first type of content and a second content collection service is configured to collect a second type of content.

Embodiments of the system may include one or more of the features described above. For example, the user interface may include one or more of a browser button, a button displayed on a webpage, and a button on a mobile device. The mobile device may include one or more of a cell phone, PDA, camera, and watch. The watch may have the ability to communicate with other devices, e.g., using RF, Bluetooth, or other communication services.

The content may include one or more of bookmarks, RSS feeds, podcasts, products, advertisements, contacts, events, images, videos, ads, classifieds, documents, and snippets of information.

The content may be displayed on a web page and the user interface is displayed on the webpage. The system may further include additional user interfaces displayed on the webpage. The additional user interfaces may be associated with content of a different type than the first type of content.

The system may further include a means for setting a default content collection service for the content, whereby subsequently activating a user interface associated with a second content directs the content to the default content collection service, the second content type being the same content type as the first content. Subsequently activating the user interface associated with the second content may direct the content to the default content collection service without presenting an option of selecting a content collection service.

The content collected may be stored in a database separate from the content collection service. The data collected may be used for determining advertisements to be displayed to a user. The data collected may be used for creating a profile of the user of the user interface. The data collected may be used for inventory management purposes.

In another general aspect there is provided a method and system for collecting content using a user interface. The method may include:

activating the user interface associated with the content;

providing a list of one or more content collections services to receive the content; and directing the content to one or more content collection services.

Embodiments of the method may include one or more of the following features or those described above or herein. For example, the user interface may include one or more of a browser button, a button displayed on a webpage, and a button on a mobile device. The mobile device may include one or more of a cell phone, PDA, camera, and a watch.

The content may be bookmarks, RSS feeds, podcasts, products, advertisements, contacts, events, images, videos, ads, classifieds, documents, and snippets of information. The content may be displayed on a web page and the user interface displayed on the webpage.

The method may further include additional user interfaces displayed on the webpage.

The details of various embodiments of the invention are set forth in the accompanying drawings and the description below. Other features and advantages of the invention will be apparent from the description, drawings, and claims.

DETAILED DESCRIPTION

Figure 1:
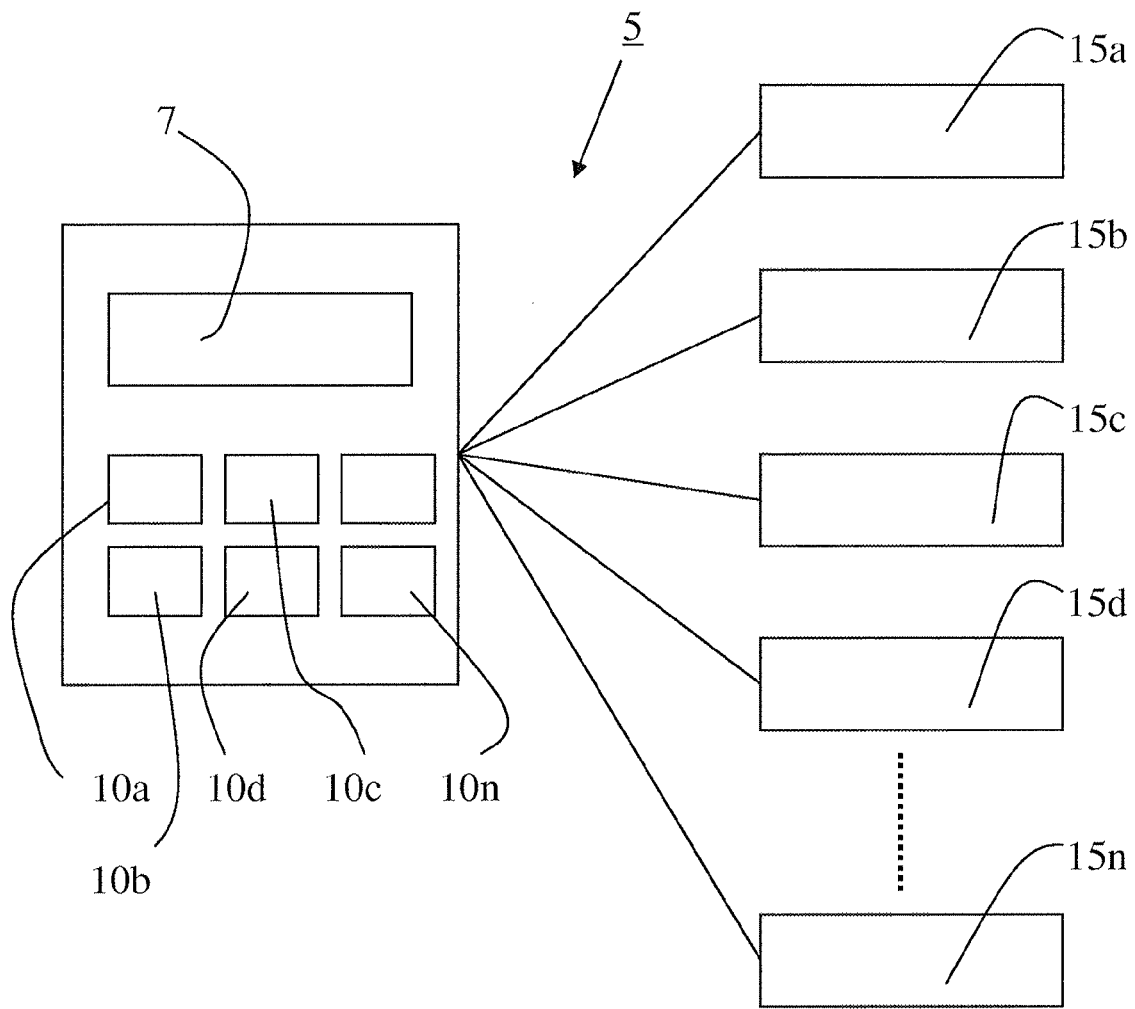
FIG. 1 is a schematic of the content flow using prior art bookmarking services.
Figure 2:
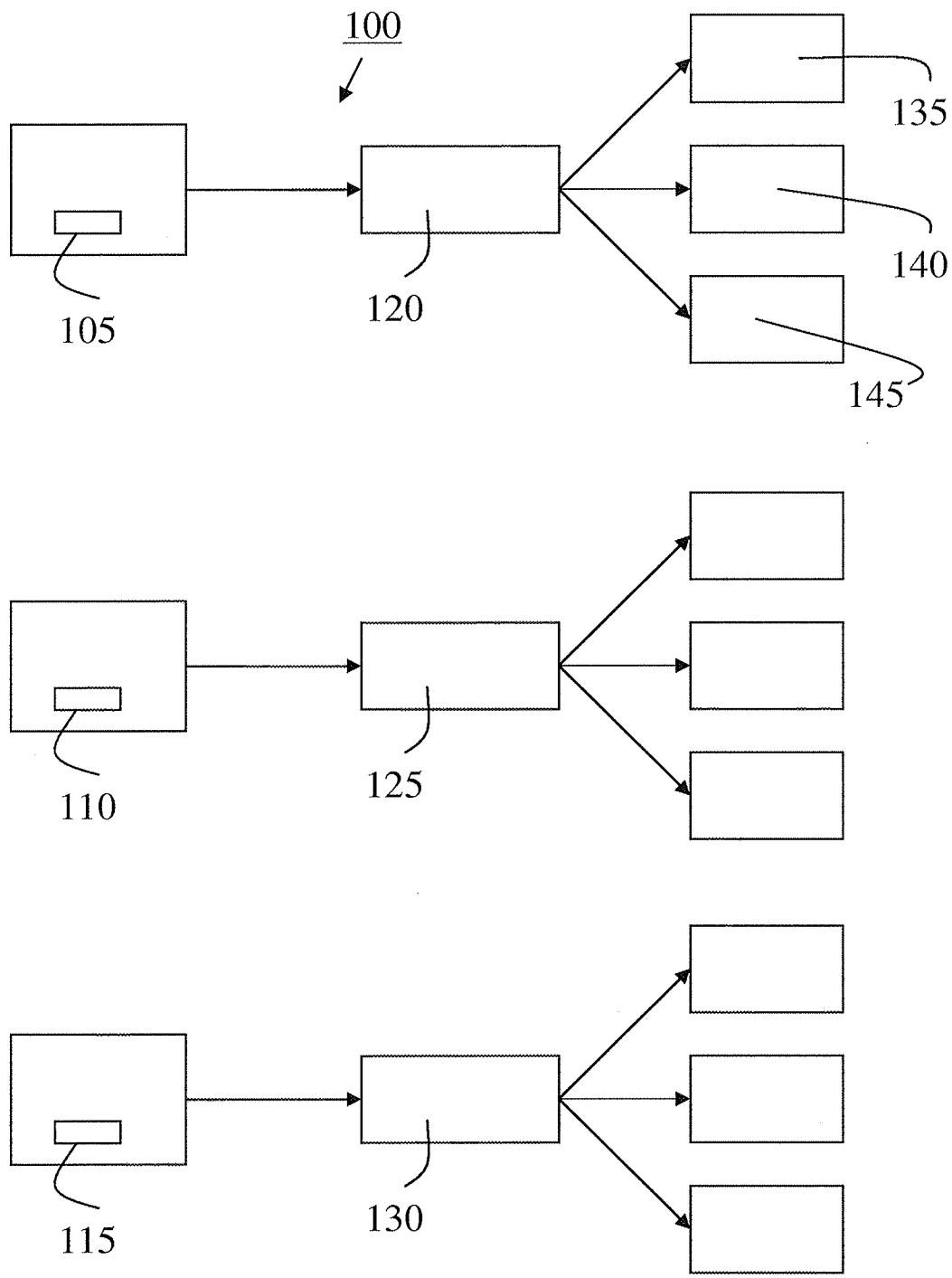
FIG. 2 is a schematic of a basic universal content collection button.

Referring to FIG. 2 an improved content collection system 100 includes one or more content-specific, content collection buttons. For example, a first content-specific, content collection button may be a bookmarking button 105, a second content-specific, content collection button may be a feed button 110, and a third content-specific, content collection button may be a podcast button 115. Other content-specific content collection buttons include wishlist, people, friends, contacts, images, videos, ads, classifieds, etc. Activating one of the content collection buttons sends the content to the corresponding content collection engine 120, 125, 130. For example, activating the bookmarking button 105 sends the bookmark content to the bookmarking collection engine 120 and the engine 120 submits the bookmark content to one or more bookmark services 135, 140, 145. The user selects the bookmark service or services to receive the content either in advance as a default setting or each time the content button is activated.

The user has a number of options when selecting the service or services to use. At a basic level, the user selects the service from a list and the engine 120 navigates the browser to the service's web page so that the user can optionally enter account information (e.g., password), tags associated with the content collected, and other information that assists in categorizing and/or retrieving the content collected. In another implementation, the engine 120 automatically submits the content to the service without causing the user to navigate to the service's web page. A significant difference between the two approaches is the content displayed to the user. In the first approach the user activates the button 105, a webpage for the service is displayed, and the user optionally enters additional information. In the second approach, the user activates the button 105, the engine 120 may prompt the user for additional information and then the engine submits the content and additional information to the service. In the latter approach the engine does not cause the user to navigate to the service webpage; instead, the engine 120 sends the information to the service using login information that the user may have provided in advance or as a result of activating the button.

FIG. 2 also illustrates additional content collection buttons, engines and destination services. They may be configured in the same manner as the bookmarking button 105, engine 120 and destinations 135, 140, 145, the difference being that the content collected is of a different type, e.g., feeds and podcasts rather than bookmarks.

Figure 3:
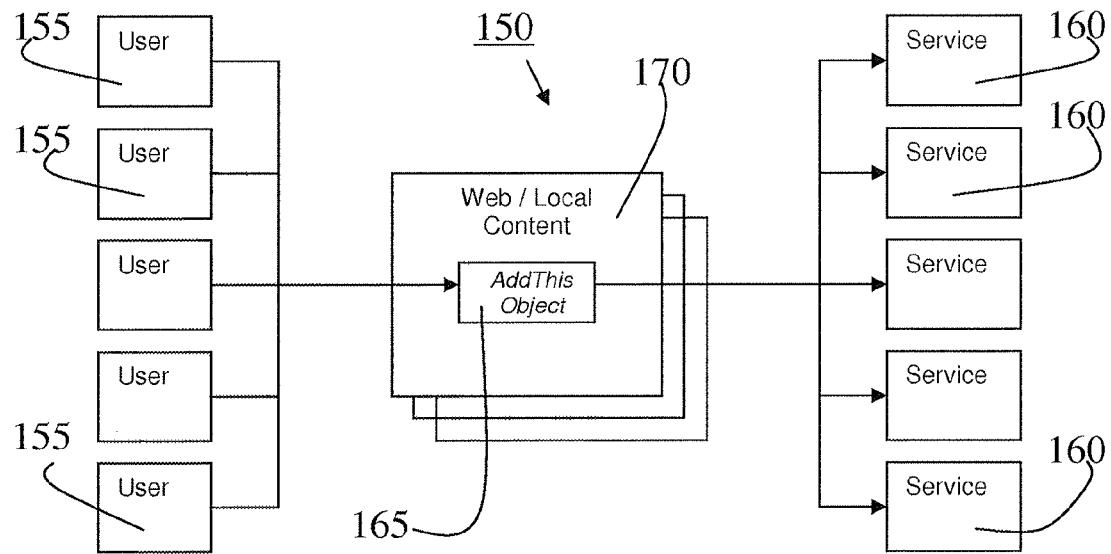
FIG. 3 is a schematic of a content-specific collection button allowing one or more users to submit content to one or more content collection services using a single content collection button.

Referring to FIG. 3, in an implementation 150 of the content-specific collection button described above, one or more users 155 submit content to one or more content collection services 160 using a content collection button 165 placed on, for example, a web page 170. In this implementation the content-specific collection button is the AddThis™ button (www.addthis.com), although other suppliers of a universal content collection button are envisioned and the instant patent is directed to more than the AddThis service. This implementation demonstrates how a web publisher can makes its content easier to collect for any visitor regardless of which content collection service the visitor uses or wishes to use. Additional benefits possible for the web publisher using this collection button are reduced screen clutter by replacing multiple buttons with a single button, no need to decide which button(s) of multiple buttons should be placed on the screen, and no need to find the correct software code for each of the multiple buttons.

Figure 4:
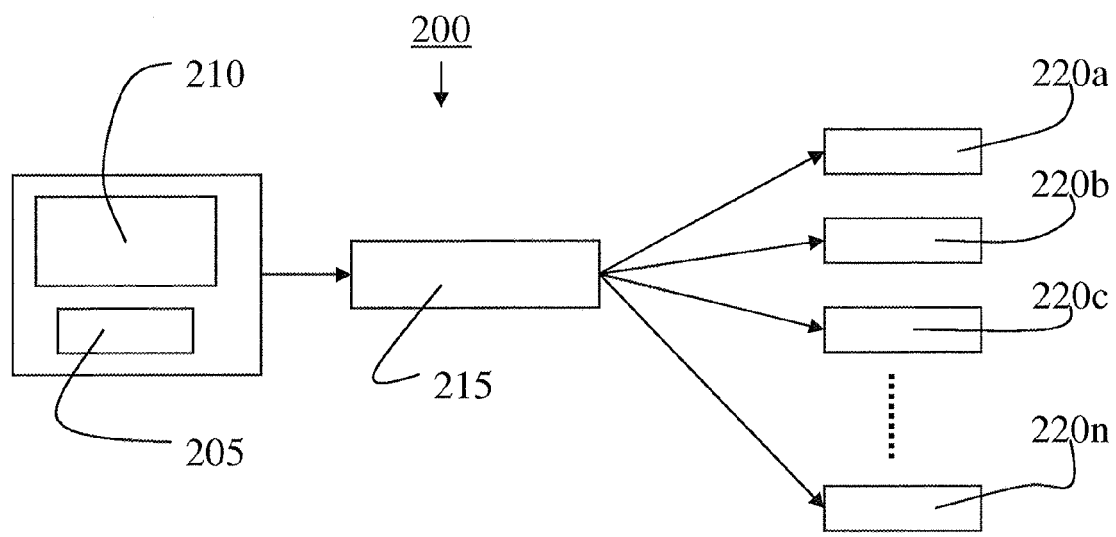
FIG. 4 is a schematic of a generic content collection system that includes a generic content collection or universal button that can be used to collect content by pressing the button.
Figure 5:
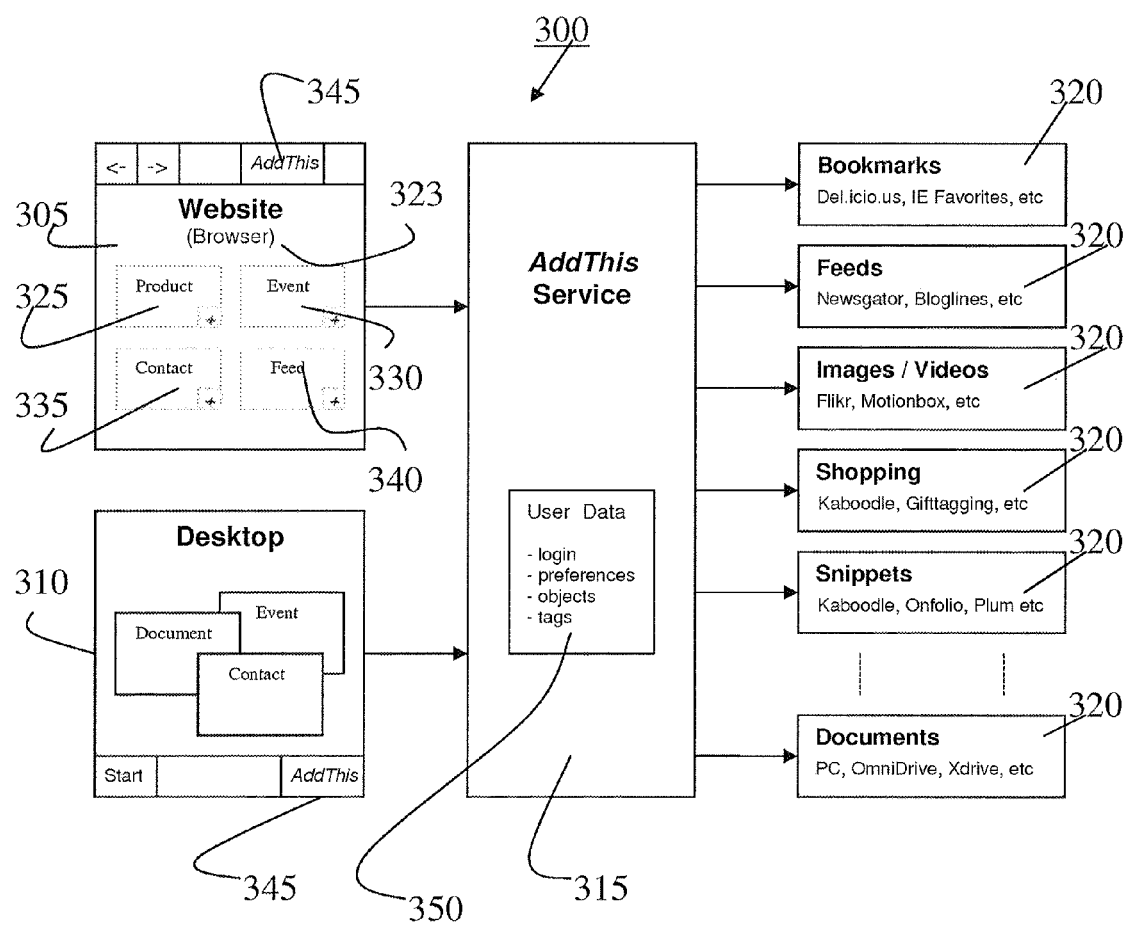
FIG. 5 is a schematic of a generic content collection system for collecting content from webpages, desktops and mobile devices and submitting that content to one or more content collection services.

Referring to FIG. 4, a generic content collection system 200 includes a generic content collection or universal button 205 that can be used to collect content by pressing the button. For example, the universal button 205 can be implemented on a browser to collect the web page being viewed, on a web page displaying an object (e.g., a piece of merchandise) to collect a picture of the object and/or information about the object, adjacent to or associated with a contact in an email to collect the contact details about the contact, on a computer or mobile device (e.g., a cell phone's camera, keyboard, watch with communication ability, e.g., RFID, etc.) to collect information captured by the mobile device, or associated with a software application (e.g., Word, Excel, etc.) to collect information from that application. The button 205 can be in the form of an actual button that is physically pressed (e.g., on a mobile device, on a keyboard, etc.) or a computer/software representation of a button that is activated on the screen by a mouse, keyboard, stylus, touch screen, voice or software command, etc. The content collected by the universal button 205 can be collected to a specified destination as specified by the user or application. For example, the user can specify that using the universal button to collect a bookmark of a web page should store that bookmark in a bookmarking service (e.g., del.icio.us, Google bookmarks), store an object or information about an object in an online or offline storage system, or store an image and information from a mobile device to a social news/recommendation service or web page.

At a basic level, the generic content collection system 200 further includes the content collected 210, a collection engine 215, and a list or array of destinations 220a, 220b, 220c, ... 220n. The content collected 210 should be interpreted broadly. At one level, the content collected includes unstructured, structured or highly structured content; metadata; images; audio; video; ads, classifieds, products, URL address, a reference to the actual content; etc. Representations of this various content include bookmarks, RSS feeds, podcasts, products, advertisements, contacts, events, images, videos, ads, classifieds, documents, snippets of information, etc.

Pressing or otherwise activating the universal button 205 causes the content associated with the button to be provided, transferred or otherwise transmitted to the collection engine 215. At a first level, the collection engine 215 processes the content provided to determine to which destination in the array of destinations the content should be sent or otherwise stored.

The manner in which the collection engine 215 processes the content is determined as a function of the web publisher's specification of the button configuration and/or the user's specification of the destination. The web publisher has a number of options for configuring the button. In one implementation, the button is available with a listing of the types of contents that can be submitted or collected. Each content type in the listing can be activated or deactivated for collecting content. Thus, one web publisher may decide that only bookmarking and feeds are applicable to its content and activate those two categories of content collection. When the user activates the button, only those types of content are available for collection. The type of content available for collection can be indicated in a number of manners. For the user, the button may include symbols or the like that are indicative of the content type, passing the mouse over the button may cause a dropdown menu to open that provides the content type that may be collected or even the destination services available for only those types of content.

In a second implementation, the system 200 is capable of searching the webpage to determine the types and instances of content to display and make available to collect. The web publisher can specify that instead of only collecting a few content types, the service should determine the types of content available for collecting and allow the button to collect any of those types upon being activated. In this manner, when activating the button 205, the user will see, for example, a drop down menu of the types of content that has been found to be available on that webpage. The user then can decide for each of those types of content the target service or services to receive the content.

As an example, the service can search the HTML of the webpage, look for special tags, metadata, micro content, etc. and list the types and instances of content available for collecting from that page. The service also can examine the metadata further to distinguish between content of the same type. A webpage with multiple feeds may have metadata associated with each of the feeds. The service can look at the different feeds and distinguish between each as being a different feed and then display as a drop down menu on the button the various feeds available on that page. Further, the dropdown menu can list destinations for each feed and content type. This process can also be used to make other types and instances of content available for collection and sharing; e.g. products, ads, classifieds, images, videos, etc.

As described above in FIG. 2, the user has a number of options when selecting the destination, destinations, service or services to use. At a basic level, the user selects the service from a list and the engine 215 navigates the browser to the service's web page so that the user can optionally enter account information (e.g., password), tags associated with the content collected, and other information that assists in categorizing and/or retrieving the content collected. In another implementation, the engine 215 automatically submits the content to the service without causing the user to navigate to the service's web page. A significant difference between the two approaches is the screen or menu displayed to the user. In the first approach the user activates the button and a webpage for the service is displayed and the user optionally enters additional information. In the second approach, the user activates the button and sees nothing more or different because the content is submitted without the need for additional user interaction.

FIGS. 2-4 describe collecting and sharing content to traditional content collection services, such as bookmarking services, feed collections services, podcast collection services, etc. Referring to FIGS. 5-9, the content collected can be submitted to a variety of other services or destinations. For example, the destination can be one or more of an email to a person or group; a social network such as Facebook, Linked-In, MySpace; printing; a comment; a rating; a statistic; related content, best seller, join community; product rating; subscribe; add to wishlist; images; videos; ads; classifieds; products, add to universal shopping cart; etc. FIGS. 5-9 illustrate an example of one implementation 300 of a content collection system with associated screen shots and flow chart. In this implementation the user can collect different types of content on a web site 305 and save that content in their preferred content collection service using a dialogue box where they can also provide additional information about that content collected. In this example, the user can collect multiple types of information from the single website 305 using a single button associated with each discrete piece of information. For example, in FIG. 5 the implementation 300 includes the webpage 305, one or more desktop or mobile objects 310, a content collection engine 315, and an array of content destinations 320.

The website 305 illustrates the use of the content collection button applied at multiple locations on the same web page for the multiple content types, including on the browser 323. The content types include products 325, events 330, contacts 335 and feed 340. It should be understood that the various content types described herein may be on the website 305 but are left off in this example merely for convenience of illustrating this implementation.

The desktop or mobile objects 310 may include an application, widget, tool, content, etc. Examples of objects include applications such as Word, Outlook, Excel, etc. in which, for example, the Word application includes the content collection button displayed in a toolbar of the application, as an icon or button 345 in a task bar.

The content collection engine 315, as described above with respect to content collection engines, receives content from the button on the website 305 or desktop/mobile object 310. The engine 315 has a database 350 of account information for each user and optionally includes content collected previously for each user and information provided by each user when using the system 300. The engine 315 sends content to the one or more content destinations 320 based on selections chosen by the user.

Figure 6:
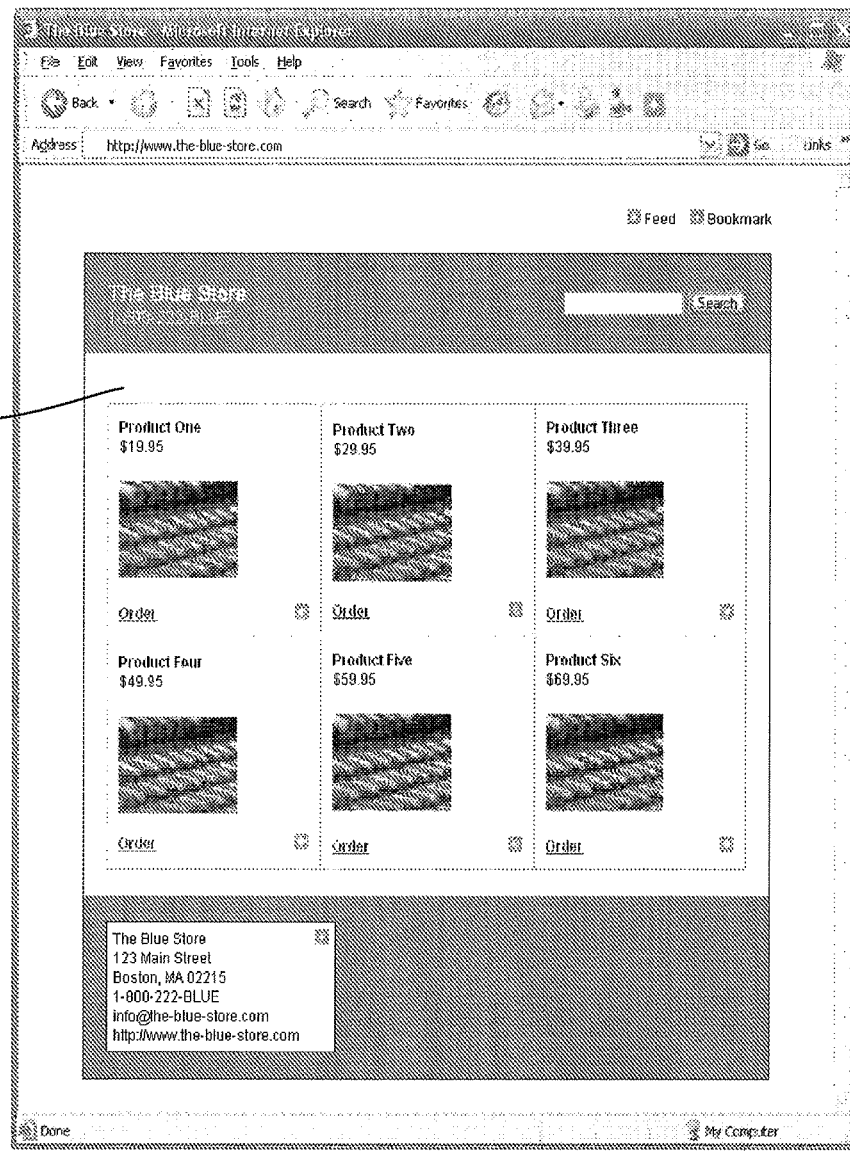
FIG. 6 is a screenshot of a webpage having content to be collected.
Figure 7:
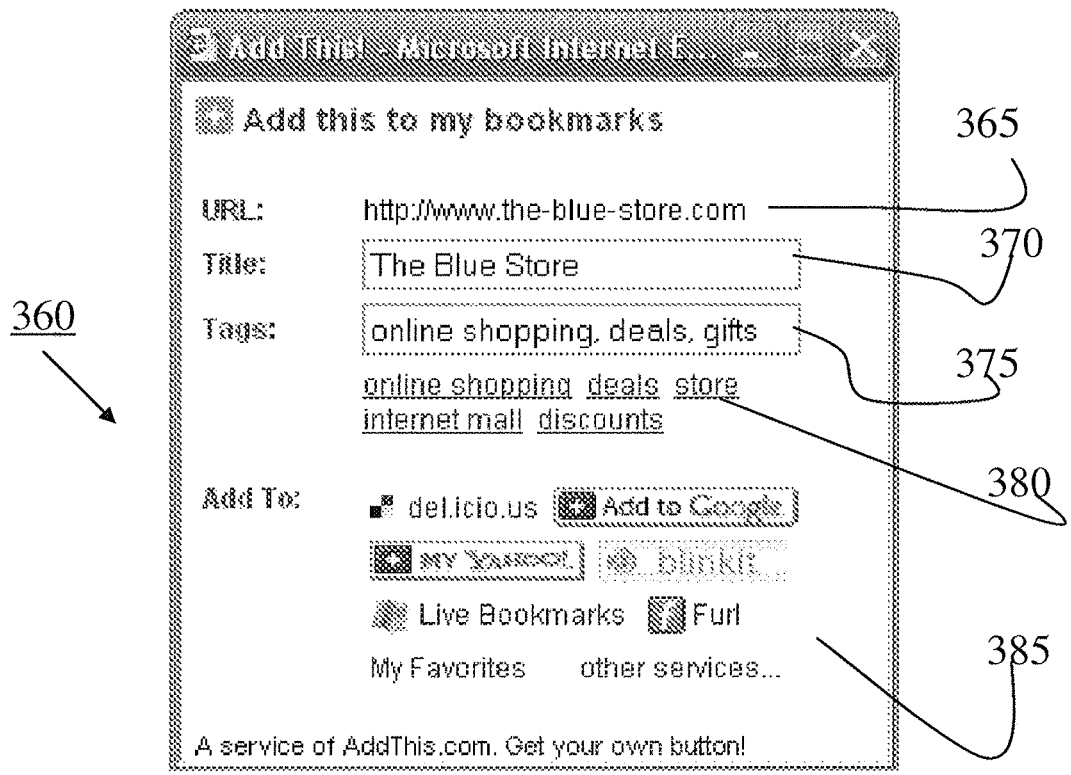
FIG. 7 is a screenshot of a first screen that could be displayed upon collecting content from the webpage of FIG. 6.

As an example, in FIG. 6 a user may view a particular webpage on the website 305 and decide to collect one or more pieces of content from the webpage. Referring also to FIG. 7, if the user decides to collect the bookmark content by selecting the content button associated with a bookmark, the user will be prompted to select the destination for the content. The screenshot 360 illustrated in FIG. 7 is an example of the prompts that may be displayed to the user after pressing the bookmark content button. The screenshot 360 includes prompts for the URL 365, a title box for the content 370, a tag box 375, optional tags 380 to populate the tag box 375, and a listing 385 of destinations. The screenshot 360 is a typical example of the prompts that will be displayed upon first using the system 300 and before the user has selected default destinations for types of content.

Figure 8:
FIG. 8 is a screenshot of a second screen that could be displayed upon collecting content from the webpage of FIG. 6.

Referring to FIG. 8, if the user has selected default destinations for specific types of content, upon subsequent usages of a content button on the website 305 the user may instead of seeing the screenshot 360 see a screenshot 390. The screenshot 390 only displays one content destination 395, that which has been previously selected by the user to be the default destination. Of course, the user may select multiple destinations for the same content type and thereby the screenshot 390 will display a listing of those destinations.

Figure 9:
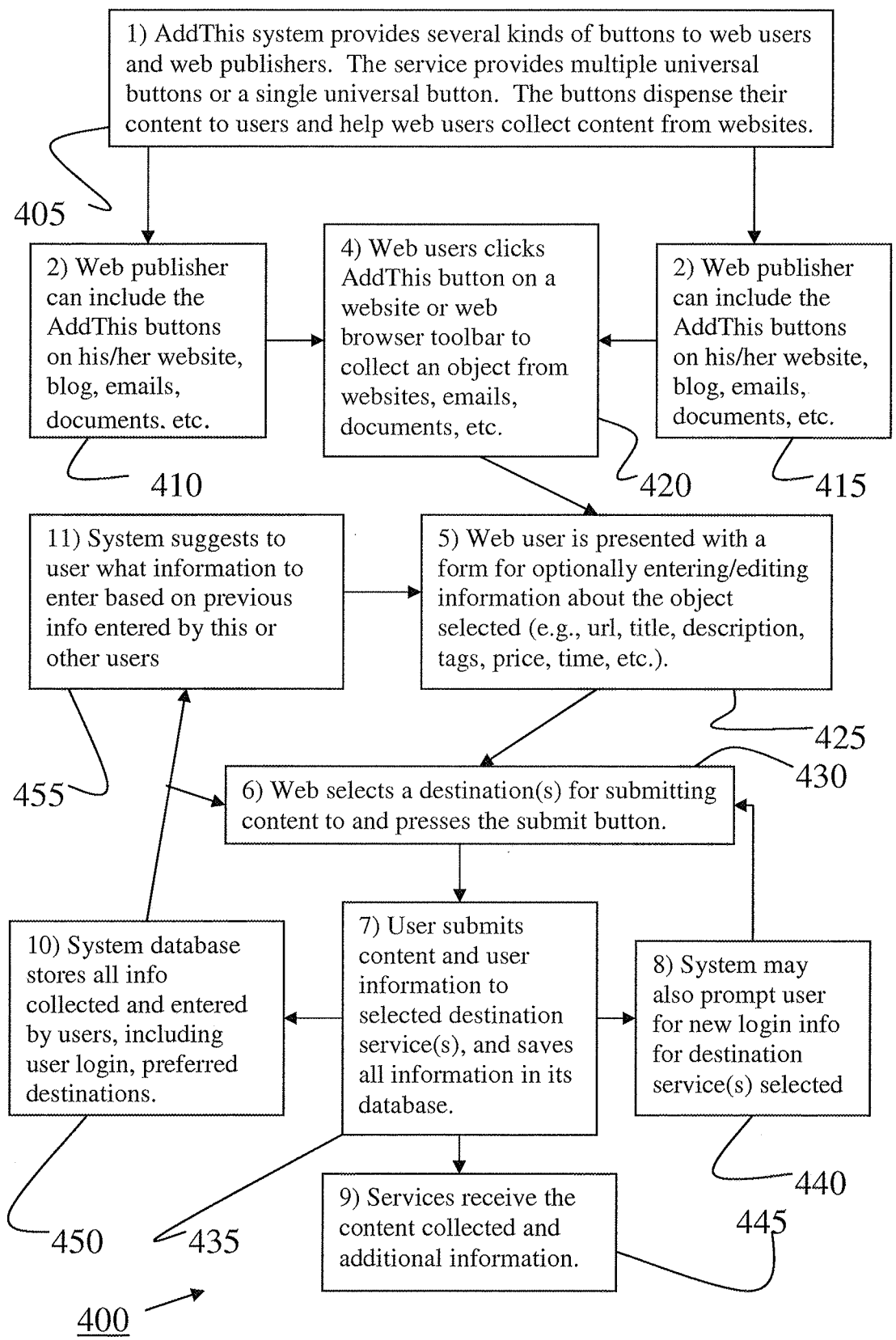
FIG. 9 is a flowchart illustrating the operation of a generic content collection system with one or more universal button(s).

The flowchart 400 of FIG. 9 depicts the process steps of the implementation of FIGS. 5-8. According to Step 405, a content collection service provides to web users and web publishers multiple universal buttons, a single universal button, and/or various implementations of the universal button(s). One implementation of the button and service is that provided by the AddThis system (www.addthis.com). As described above, the button(s) help web publishers dispense their content to users and help web users collect content from websites. The buttons help collect/dispense any kind of content, for example web bookmarks, web feeds, podcasts, images, products, classified, discounts, music, documents, videos, events, etc., as described above.

According to Step 410, a web publisher can use the AddThis button or other universal button(s) on any content they produce, for example websites, blogs, emails, documents, ebooks, ads, etc. Software makers can integrate the AddThis button in their applications. Advantageously, by adding the universal button(s) to their content, web publishers insulate themselves and their users from confusion created by the fast growing number of services and methods for collecting content. In addition, the web publisher increases the quality and quantity of the content web users can collect because the web page is not as cluttered with content collection buttons. As noted above, the universal button(s) can take many forms: html code, client scripting (e.g. javascript), server scripting, flash, images, etc. The button(s) can optionally contain information to further describe the content they represent. This information can be any attribute for the content (e.g. url, title, description, keywords, upc, brand, price, time, type, color, size, etc).

According to Step 415 a user can install the AddThis or other universal button(s) in their web browser, application, computer, or electronic device (pda, cellular phone, etc). By installing the buttons, users insulate themselves from the multitude of services and methods for collecting content, as well as the confusion created by attempting to keep the content collected and categorized.

According to Step 420, a user can click or select the AddThis button or other universal button(s) on a website, blog, email, document, web browser, computer, application, electronic device, etc. to select and collect an object, or piece of content.

According to Step 425, a user can optionally add/edit information about the object selected. This information can be any attribute of the object (e.g. url, title, description, keywords, upc, brand, price, time, type, color, size, etc), or its content itself. The information can be added or edited in a variety of manners known on the Internet, such as popup windows, fields that appear based on the position of the mouse, a second screen for entering information, etc.

According to Step 430, the system may optionally prompt the user for the destination of the content collected. Examples of content collection services are Google, My Yahoo, Live, del.icio.us, Bloglines, Newsgator, Kaboodle, Digg, OmniDrive, and the like—essentially any content service that takes input from users or groups of users.

According to Step 435, the system submits content and additional user information to one or more user-preferred destination services. The system can identify users by login, cookie, IP address, or other identifier. By identifying the user, the system can use defaults created by the user for saving content in specific destinations.

According to Step 440, the system may prompt users for login info for destination service(s) selected. Step 440 is optional, for example, if the user does not want to provide login information to the system but is willing to provide the login information to the destination service at the time of using the service. Of course, the user may be willing to provide multiple passwords to the service so that it is more convenient to select destinations when using the universal button.

According to Step 445, the one or more content collection services receive the information sent by the AddThis system or other universal button service.

According to Step 450, the system optionally stores all information entered or collected into a database. This includes, for example, information collected and entered by users, user logins, preferred destinations, micro-content, user data imported from content collection services, etc. This information can be used for a multitude of purpose, including helping web publishers track the demographics of its user, web retailers determine which products are being viewed (e.g., for tracking inventory and determining what should be kept in the store or in a warehouse or distribution center), etc. The information can be stored on an individual user basis, on a demographic basis, or as a collective basis for all users. The applications of this information is described in more detail below.

According to Step 455, the system may suggest to a user what information to enter based on previous info entered by the user him/herself or by other users. This can be useful to the user because they may not know the best manner of categorizing the content or which destination service to submit the content. For example, the system can store the tag associated with the object or content and list the top tag or top three tags for the user to have the option to use. This process advantageously increases the convenience to the user by removing some of the uncertainties that come with multiple options.

The data collected using the universal button(s) or AddThis button may be useful in numerous applications, as described below. Viewing the Generic Content Collection Systems (GCCS) as a whole, there is a universal button or AddThis button that is seen by the web user on either a web page, the user's own browser, the operating system, hardware (e.g., electronic devices) or a web or computer application. In particular, the GCCS can be implemented as a stand alone service or implemented in any software application, tool, api, module, object, widget, etc. However, this is only that portion of the GCCS seen by the web user. In addition to the universal or AddThis button there also are one or more web servers, one or more databases, and one or more applications and application servers.

A first application of the system described herein relates to an advertising network in which the GCCS (Generic Content Collection System) stores all data collected by users into its own database. This data is used to build an internal profile for each user over time. The purpose of the profile is to identify information about the user such as interests, age, gender, geographical location, and other demographic data, etc. This is done by processing collected content information, text, metadata, site URL, user IP address, by conducting surveys, social network (links to other web users—inside or outside the system), or other external sources.

As users collect content from websites and blogs, the GCCS may occasionally display a contextual ad (text or graphic) to the user. To determine which ad to display to a given user, the GCCS uses the information stored in that user's internal profile. By using this information, the GCCS is able to target ads by user interest (past or present), location, age, gender, interests, content collected, etc, and by analyzing profiles of users known to that user, etc. By correlating profile data with other users (known or unknown by that user), the GCCS can also infer new likely interests for a given user. The profile of users can also be augmented or confirmed when users click (or don't click) on ads presented to them, as well as through surveys.

The ads displayed in the GCCS network come from advertisers that are members of the GCCS network, or from other contextual ad networks. When submitting ads to the GCCS network, advertisers can choose the target audience based on the user profile attributes listed above. For example, an ad about digital cameras may be shown to users that have previously collected or shared, or received content related to digital cameras. Or an ad about a Rolling Stones concert in New York may be shown to users that have previously collected, shared, or received content related to the Rolling Stones (or related artists) and/or are located in the New York area. Further, the GCCS may also present ads about a Rolling Stones concert to the users that are friends with a user who has previously collected content related to the Rolling Stones. These ads may be presented either in the form of an offer or news for the friends themselves, or in the form of a gift idea to these friends for that user.

A second application of the GCCS relates to the use of metadata in augmenting the content collected by users using the universal button(s). The use of metadata by the GCCS allows the web publisher to further describe the content on their page without necessarily displaying that content. This is useful, for example, when the quantity of information relating to a particular product displayed on a web page would clutter up the web page if it were displayed. However, the viewer or web user might like access to that information after collecting that content (i.e., the product). This is particularly useful for a complex item, such as a plasma television. When using metadata in the context of a GCCS, the web publisher could display the plasma television, dimensions, screen aspect, pixel pitch, supported video standards, contrast ratio, price, discount, and a brief description. This would allow the web user to make an initial determination as to whether or not they want to look further at this item. If they remain interested after seeing the visually displayed information they can click on the AddThis button (or other universal button) and collect not just the visual information but also the metadata that is provided with the item. This information, at least for the plasma television, can include specifications such as pixels, resolution, and other technical information that a purchaser of a plasma television might wish to review before making a purchase. The web user might also want to compare the technical specifications with those of other plasma televisions collected from the same or other web sites.

The metadata can be specified by the web publisher of the web page in a commonly accepted format such as the microcontent format standard or various XML vocabularies, both currently existing and developed in the future. An objective of specifying the metadata is to provide the user the ability to use the AddThis button to collect not just the visually displayed information but also the metadata associated with a product. In other words, the combination of the AddThis button and the metadata allows web users the ability to collect as much information as possible. This is of advantage to the web publisher who can design a page with a good visual appeal but also provide the web user the ability to collect detailed information about the product (i.e., web content) by merely pressing a single button, the AddThis button. As content collection services continue to evolve and allow users to save more data and metadata about objects they collect, the AddThis button will become more and more useful to web users, web publishers and content collection services.

A third use of the GCCS and the universal button(s) relates to performing analytics on the data collected. The data collected by using the AddThis button may be stored in a database. The data then can be aggregated in numerous ways to provide valuable statistics and trends about the content collected either on a web site or across all web sites. For example, web publishers might be interested to know which products on their web site are collected the most, or alternatively, those products that receive the least attention (as measured by clicks of the AddThis button or other universal button(s)). This information can be useful to determine what is effective or popular on the web page and what is not. As another example, the web publisher may which to know the location of the people interested in a specific product, or interested in product by geographic location. As an example, a national book retailer may wish to determine the geographical location of the people interested in a particular book. This information might be useful in determining what books to display at different stores by region across the country.

A fourth application of the GCCS and universal button(s) is in communication and personalization of the content viewed by a particular user. The content collected across multiple, unrelated web sites by an individual user with the AddThis button can be used by the GCCS to create a profile of that user. This profile then can be used to enhance the communication from the web publisher to that web user by the web publisher. For example, the profile created by the GCCS can be used to better target product offerings to a user on the web publisher's web site by allowing the web publisher to be alerted to a pre-specified interest of that user such that the web publisher can personalize the web page to display information of greater interest to that user.

This may be implemented by the web publisher signing an agreement with the GCCS to supply full or partial profiles of users, with the users' approval. The partial profile may be based on a listing of possible attributes of the user that can be selectively specified as being of interest to the web publisher. Then when the user visits the web page a series of steps is initiated that provides the web publisher with information useful for personalizing the web page content for that user.

A fifth application of the GCCS relates to social databases. Under this implementation, the sum total of the information collected by all of the users is accumulated over time and used as the basis for a search engine. This search engine differs in one aspect from conventional search engines by being based on content collected by users, as opposed to collected by a program, and based on the use of microcontent and metadata. As a consequence, the resulting search engine can be used for searching by object attributes rather than merely by keywords. One attribute that can be displayed is the popularity of an item or the ranking of an item displayed can be based on the number of collections of that item. For example, if a user is interested in MP3 players, when they enter 'MPS Player' into the search engine the resulting display will order or rank the MP3 players based on the number of times a particular MP3 player has been collected using the AddThis button.

A sixth application of the GCCS and universal button(s) relates to two tier advertising—an alternative advertising accounting method to pay-per-click. Currently web publishers are paid by web advertisers based on the number of clicks on that advertisement displayed on the web publisher's web site. This provides an inference that a user is showing some interest in that web site but does not take into account the degree of interest in the content displayed on that web site. With the AddThis button, the web advertiser will have an enhanced inference of a web user's interest in a product on the web page if the user clicks on the AddThis button associated with that product. This enables a web publisher to set a two tier advertising rate based on a first rate for clicks on a web page and a second, potentially higher rate for an AddThis collection of a product on that web advertiser's web page or collection of the web address itself using the AddThis button.

A seventh application of the GCCS and universal button(s) relates to the ability to provide comparison shopping tables containing content collected from multiple sites, and optionally use metadata to set up the table. With reference to the discussion above regarding metadata, if metadata is used with products on various web sites, when the AddThis button is used to download the content relating to a particular product, the web user will have a greater volume of information about that product than would be seen visually. Upon downloading content from various unrelated sites that yet relate to a common product (e.g., MP3 player), the GCCS can use the metadata to prepare a comparison table of the products from the different web pages. The table can show all the products and the features of those products in a readily comparable manner. This can be displayed such that the user can make a more informed comparison over a cross section of products from multiple unrelated web sites than if they were limited to using the information as displayed by each individual web publisher on the individual web sites.

An eighth application of the GCCS and universal button(s) relates to tracking and analyzing trends for items on a web publisher's page, and can be used for inventory management or deciding which item to stock quickly. Referring to the discussion on analytics above, the trend feature of the GCCS can be used by a web publisher to determine which products are of interest to web users visiting their web site. This information can be used to predict which items will be of greater interest in, for example, the web publisher's stores. Such information can be used to manage inventory, plan displays of product, and request product manufacturing, all to ensure that the company can meet the demand for a product before the demand overwhelms the company's ability to supply that product. In this implementation, the GCCS can be used as a method of managing product inventory. The method may include:

(a) providing a web page with one or more content collection buttons associated with one or more products;

(b) registering the occurrence of a web user clicking on the content collection button; and (c) tracking the occurrences of the clicks of the content collection button. The tracking can include one or more of the product clicked, the time clicked, the geographical region of the user who clicked.

Figure 10:
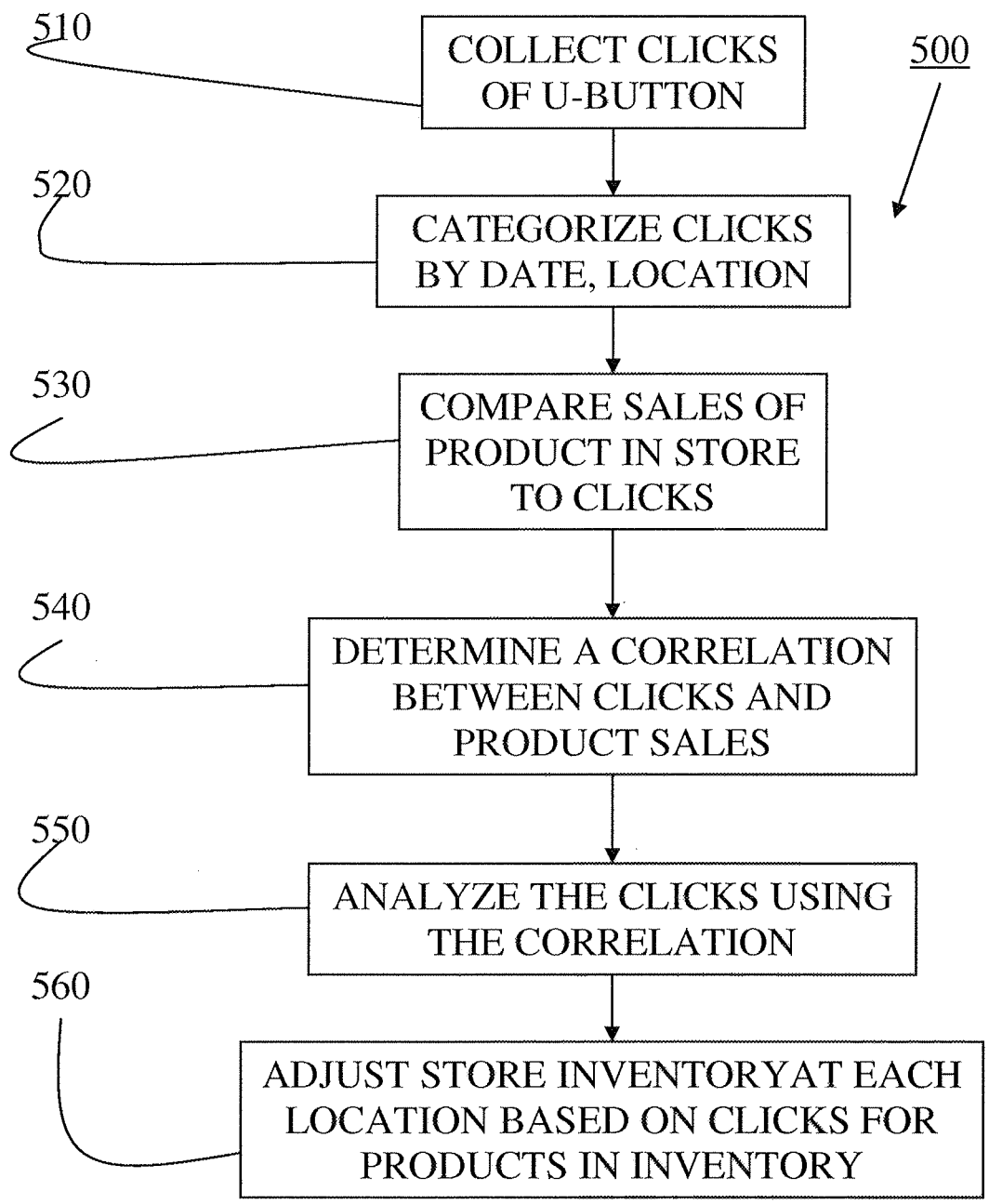
FIG. 10 is a flow chart illustrating one application of the universal button and/or generic content collection service to manage store inventory.

FIG. 10 illustrates a process 500 of using a GCCS system and/or universal button to manage inventory. Referring to Steps 510-540 the web retailer initializes the system to correlate the collection of a product using the GCCS with sales of that product. For example, according to Step 510 the web retailer has a universal button associated with a product on a web page displaying the product. As web users use the button to collect content, such as a particular product (e.g., MP3 player) from the webpage that content collection event or click is stored in a database of the GCCS, web retailer, or collection service. According to Step 520, the GCCS, web retailer or collection service optionally categorizes the uses of the universal by user, location of the user, product, date, etc. With this data collected over time, and using sales trends from the web retailers bricks-and-mortar locations, the web retailer or GCCS can take the content collection trends for a particular product and compare sales in the brick-and-mortar locations with clicks of the universal button for the product on the company's web retail page (Step 530). The web retailer then can determine if there is a correlation between clicks for a product on the web page and subsequent product sales at the bricks and mortar location (Step 540). The web retailer may find that on a Monday there is an increase in the collection of a particular MP3 player by users located in a known area. The web retailer then may find that on the Wednesday two days subsequent there is an increase in purchase of the particular MP3 who collection activity on the web page was monitored. Using this data, the retailer may determine that by tracking the trends of universal content collected on one day, then they need to increase the stock at the bricks and mortar retail location two days later but not constantly. According to Step 550, the web retailer then may prospectively analyze clicks or usage of the universal button using the correlation developed earlier. With the correlation, the retailer may reduce its inventory level in a store and adjust it based on web clicks or content collected (Step 560). This type of inventory management allows the retailer to reduce the inventory in the stores and keep more of the inventory in a central warehouse. Moreover, by providing the items to the stores only when needed, the retailer can reduce the total inventory of a product at the warehouse as well as within the entire supply chain.

In a ninth application of the GCCS and universal button(s), the system can be used for collecting advertisements. Often times users see web ads and may be interested but may not have the time to examine the ad more closely or visit the web site. In such a circumstance, if the ad had an AddThis button or other universal button associated with it the web user can merely click on that button and have the content of the ad saved for later evaluation. This is a different method of collecting advertisement content and can be valued by a web publisher and web advertiser differently from the traditional method of valuing clicks on a web page, impression of the ad, or cost per action. The web advertiser could then pay an advertising fee based on the number of collections of that ad. These ads can be on the web site of the web publisher who displays advertising or a search engine whose search results include advertisements. The advertisements described herein can be, for example, text or graphic ads, including videos, flash etc.

A tenth application of the GCCS and universal button(s) relates to collecting user-generated content and offline bookmarking. This application allows user to add info they collect or generate, such as collecting travel info, day-to-day info, news info, etc. and uploading to a Youtube-like web page that everyone can search and view by topic etc. Recommendations and editorial comment can be added by the content collector. The result is a collection of multiple types of user-generated content shared over the Internet. For example, Youtube is a collection of one particular type of user-generated content, specifically video content, uploaded to the Internet. In contrast, this functionality of the GCCS would allow uploading of any type of user-generated content, such as information about or relating to a tangible object, such as a person, place, thing, event, etc.

For example, if a person is on a trip they may wish to generate content related to their journey and their experiences along the way. Thus, after visiting a good restaurant they may wish to generate content about their experience at the restaurant. To do so they could use either their cell phone, computer, or other electronic device (e.g., a mobile device) to upload content to the GCCS. In one implementation the content uploaded from a cell phone could be picture(s) of the outside of the restaurant, the inside of the restaurant, the meal, the staff, menu, etc. The pictures could be accompanied by text entry of the name of the restaurant, location and contact information for the restaurant, comments about the experience at the restaurant, a rating of the restaurant experience, and information about prices (including the prices themselves). This type of user-generated content could be repeated at various restaurants, hotels, museums, events, and places of interest generally, along the trip. At the end of the trip the person can go back and look at what is effectively their travel blog for their trip. More likely, however, is that the accumulation of this type of user-generated content will create a database that others can access for information useful in planning trips. For example, if a person is traveling between two cities they may wish to locate restaurants that have a particular average rating, match particular culinary preferences or dietary restriction (e.g., vegetarian, kosher), or have some characteristic that has been captured by the user-generated content and now can be searched.

When the person in the above example visits the restaurant and wishes to upload the content, the GCCS can use an algorithm to create or assign a reference number or other identifier to be associated with the restaurant. The reference number or identifier can be used to facilitate accurate identification of an object, in a manner similar to that provided by a URL. In one implementation, the identifier can be a URL. In other implementations the identifier can be one or more of a barcode, Qcode, number, ID, phone number, GPS location, or image. In another implementation the identifier can be a scheme based on an algorithm defined by the GCCS to assign unique, universal identifiers. As content is uploaded over time, the GCCS accumulates large amounts of information about objects both online and offline, and relationships between objects. This information can be used by any person or program to search for information about a topic of interest, as well as other searches depending upon the user interface or API.

Continuing the example above of a trip, the GCCS could provide an itinerary planner service based on user-input preferences. For example, the user may be traveling from New York City to Disney World and wishes to find restaurants, hotels, events, people, and scenic places that have certain characteristics, such as price, an average rating level, type of event, etc. By entering the starting and ending location, dates of travel, and the various detailed preferences, the GCCS can search its database to provide a trip itinerary with hotels, restaurants, events, people, and places that meet the criteria. As a source of revenue, content related advertising can be displayed. For example, if an itinerary is created from New York City to Disney World, advertisements can be displayed for restaurants, hotels and other places of interest located in the towns recommended in the itinerary.

Figure 11:
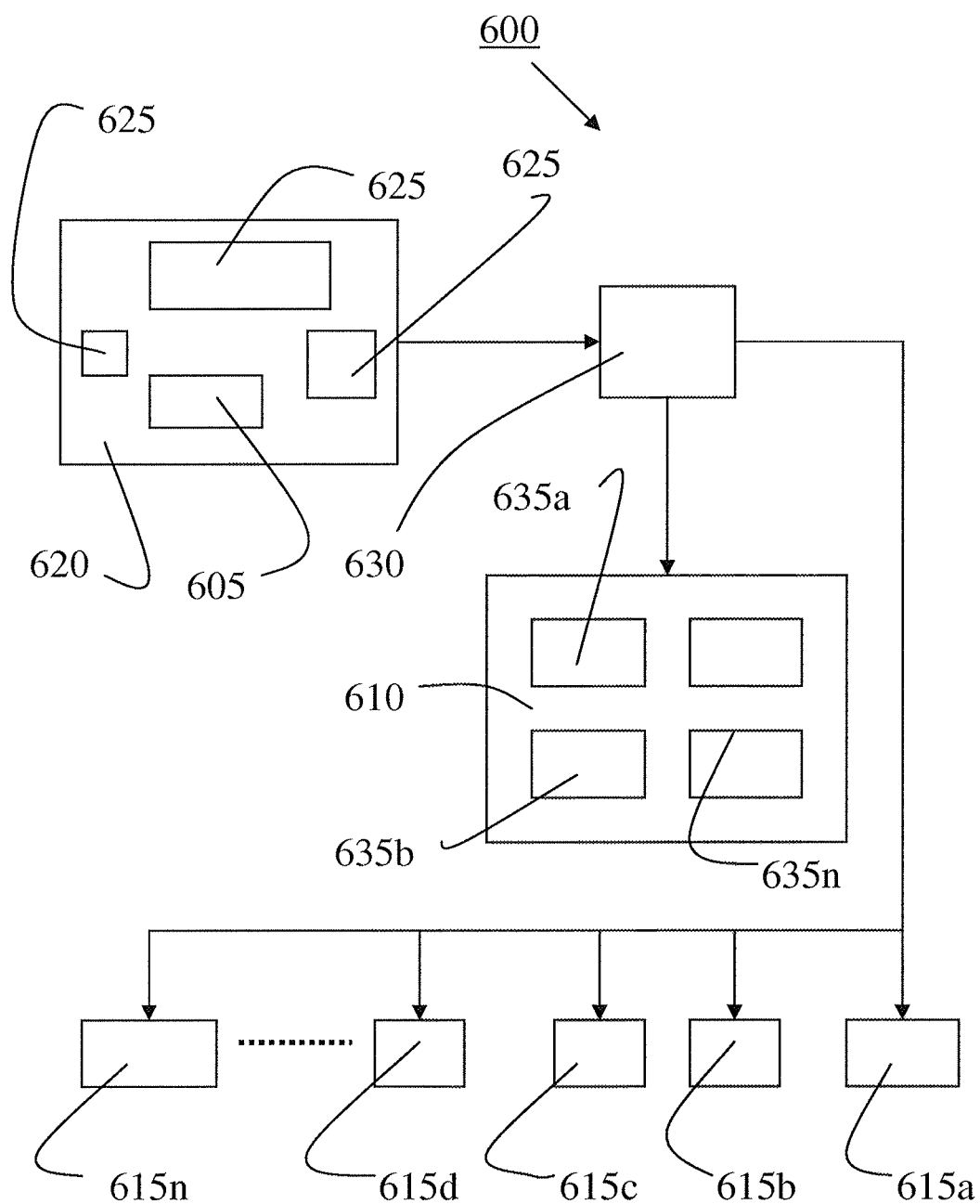
FIG. 11 is a schematic illustrating the application of the universal button to submit content to a generic content collection service.

Referring to FIG. 11, in an eleventh application of the generic content collection system and/or universal button(s), a generic content collection system 600 may include a universal button 605 that is linked to its own universal or generic content collection service 610, and optionally to the one or more other collection services 615a, 615b, 615c, 615d, . . . 615n that are differentiated by type of content collected. The generic content collection service 610 advantageously may include the ability to store all content types within one service and further reduce the confusion associated with the multiple services and their division by type of content. In the implementation of FIG. 11, the user may activate the universal button 605 on a webpage 620 to collect one or more contents 625 from the webpage. Activating the universal button 605 submits the content(s) 625 to the engine 630 which can be configured to determine the content types collected (e.g., podcast, feed, etc.) and store the content in the service 610 in the proper content type category 635a, 635b, . . . 635n, which may be differentiated by the content categories conventionally used (e.g., feeds, podcasts, bookmarks, etc.).

In many respects, the generic content collection service will store the content in a similar manner as which documents are stored on most personal computers. Specifically, a user may store Word documents, Excel spreadsheets, PDF documents, video files, audio files, pictures, etc. on the same hard drive or storage media. Within the hard drive or storage media the various types of content may be stored within a common folder but differentiated by file type extensions. In the same manner, the various content types can be saved in a common folder and differentiated by content type in a manner similar to file extension. Alternatively, the content can be stored in subfolders that are differentiated by content type.

The functionality of the GCCS system is varied. For example, the GCCS can be used to collect any of the typical content available on the Internet. For example, the GCCS may be used to collect any one of the following Bookmarks, URLs, Products, Text, Ads, Classifieds, Coupons, Feeds, Music, Podcasts, Images, Videos, Products, Shopping, Events, People, Snippets, Files, Documents, Search Engine results, Links. For example, if a user is on a web page and desires to collect as a bookmark the user would click on the GCCS button and the URL bookmark be sent to the user's preferred destination(s) for such content through the GCCS. If the content to be collected is a product, the GCCS button would be located in the proximity of the item on the web page. By clicking the button, the information about the product would be sent to the user's preferred destination(s) for such content through the GCCS. As may be evident, this is the same method for transferring the information as would be used for the bookmark collected. However, if the information collected is about a product, the amount and type of information collected can be quite variable. For example, at one extreme the information collected may simply be the URL of the page. Additional information can be provided based on how the web page is set up and/or how the GCCS button is configured and/or how the web page sets up the GCCS button specifically for the content on that page.

The information sent by the collection button on the web page can be specified first by standards for content description (e.g., micro-content, xml vocabularies, database, text files, etc.). As an example of this, the button can be specified to search, find and collect information based on items or item types that can be used to provide a profile of the item collected. These items or item types will have particular attributes, both basic and defined, associated with them, such as title, description, keywords, and perhaps a URL as examples of basic attributes. Examples of defined attributes will depend upon the item type. The number of item types is not limited but varies on a real-time basis as people use the Internet and reflects what users want to describe. For example, known or common items include recipes, people, products, houses, services, video, images, ads, classifieds, and events. The attributes associated with each of these item types may be completely different from each other or have some in common. For example, a recipe item type may have the following attributes: calories, course, fat content, preparation time, etc.

As another alternative, the web page can be set up to include metadata about the content of the page and items on the page. The GCCS button then would collect the information about the page including the metadata. As yet another alternative, the web page publisher can complete the configuration of the button to provide the item type and attribute information for the GCCS button. Thus, in the example of the recipe information above, the web publisher can specify the item type to be recipe and provide values for the attributes listed above.

The GCCS is not limited to particular locations or connectivity. For example, the system can be used online, offline, or with a mobile device. Collecting content online refers generally to collecting information from web pages, online services (e.g., RSS feed, podcast, etc.), etc. Collecting content offline for example can be collecting content using a device to collect information without using the property of being online to collect the information. This can be using an RFID scanner, a bar code scanner, Q-code, key pad, camera function of a phone, laser, or other visually-based system, SMS text messaging, etc. For example, a smart phone can be configured to have a GCCS button either as software or hardware and using the button causes the capture of information about an item. For example, a visitor to a museum may wish to capture a reference to an item in a museum for later viewing. The user may wish to store the content in various destinations. These destinations may range from a completely public and centralized GCCS, such as was described above for the trip itinerary planning implementation, to a more private or local, device-specific location such as a PDA in which preferences are set by the user for determining whether the information is shared or retained locally without sharing.

In a twelfth application of the GCCS, the system is configured to also act as a social network. In this implementation, the users of the GCCS can collect content they find online or offline and share it with their friends via email; text messaging; instant messaging; social networks such as Facebook, MySpace, LinkedIn, etc, or via the GCCS itself. If the user chooses to share content through one or more external social network (e.g. Facebook, MySpace, LinkedIn, etc) the GCCS will perform this operation using the API provided by the corresponding service(s), using login information and recipient usernames provided by that user. If the user chooses to share content via the GCCS itself, the GCCS will perform this operation by optionally prompting the user for contact information for each recipient user (e.g. name, username, email address, phone number, instant messaging username, URL, etc). If a recipient user is already a member of the GCCS, that user can also be identified using his/her GCCS username. Users of the GCCS can also invite new users to join the GCCS. Users of the GCCS can also create and join groups of users. Through these and other mechanisms, the GCCS acts as a social network where users are not only connected through their interests and content they collect over time, but also through the connections they create when joining with, connecting with, inviting, and sharing with other people or groups. And by extension, people are also connected through the content, people, and groups associated with the people they are connected with through the system, directly or indirectly. The GCCS may also include other factors when connecting users, including geographic locations, age, gender, birth date, occupation, civil status, etc.

The GCCS may also assign levels of authority to each user, for each of their areas of interest. This level of authority (for example from 0 to 10—with 0 meaning no authority and 10 meaning maximum authority), can be used by the system in combination with other factors to compute a qualitative value for a given piece of content collected. Since bookmarking or sharing content can be interpreted as a vote for that content, the inclusion of an authority factor can further help the GCCS determine which content is truly valuable and relevant and which content is not, by also factoring in who is collecting that content. For example, content about digital cameras collected by a long-time user with strong interests in digital cameras or related topics, and with consistent usage patterns will likely be assigned a higher quality value by the system than if collected by a new user with no interests in digital cameras, and with irregular usage patterns.

The authority index (or level) for a given user and interest of that user is computed using 1) attributes of that person and his/her internal profile. 2) attributes of the content collected/shared, and 3) the authority index of the people connected to that person for that interest and/or related interests. The various factors mentioned above under 1) include: a) all demographic attributes: age, birth date, gender, geographic location, etc b) internal profile attributes, interests, etc c) join date, frequency of use, usage patterns, etc. The attributes of the content collected include keywords, URL, metadata, etc.

While several particular forms of the invention have been illustrated and described, it will be apparent that various modifications and combinations of the invention detailed in the text and drawings can be made without departing from the spirit and scope of the invention. For example, the content may be collected by watches that are modified for offline or online content collection (e.g., bookmarking, etc.). Watches are one of the most ubiquitous objects in use today and are easily accessible at most, if not all, times. If watches were to be modified to have a small scanner (e.g., barcode, RFID, etc) and a small content collection button or user interface, e.g., an AddThis button for bookmarking, an offline object (e.g., an ad in the newspaper, new movie, a product in a store, could be collected using the scanner on the mobile phone. Moreover, references to the AddThis button and/or service are not intended to limit the invention but merely are exemplary of one implementation of a universal button and GCCS. Accordingly, it is not intended that the invention be limited, except as by the appended claims.

What is claimed is:

1. An apparatus, comprising:
a computing device;
the computing device configured to present to a user a user interface associated with first information of a first type and second information of a second type;
the computing device configured to receive a signal indicative of a user selecting to collect the first information of the first type;
the computing device configured to send, in response to the signal, the first information of the first type to a first information collection service such that the first information of the first type is stored in a database, the first information collection service being a preferred information collection service of the user to collect information of the first type; and
the computing device configured to send the second information of the second type to a second information collection service.

2. The apparatus of claim 1, wherein at least one of the first information of the first type or the second information of the second type is used to identify an advertisement to present to the user.

3. The apparatus of claim 1, wherein:
the user interface is a first user interface, the computing device configured to present to the user the first user interface at a first time; and
the computing device is configured to present to the user at a second time a second user interface based on at least one of the first information of the first type or the second information of the second type.

4. A method, comprising:
presenting, using a computing device, a user interface to a user on a display, the user interface associated with first information and second information, wherein at least one of the first information or the second information is to be stored in one or more databases;
identifying, using the user interface, a first type of information, the first type of information associated with the first information;

identifying, using the user interface, a second type of information, the second type of information associated with the second information;

receiving a signal indicative of a user selecting to collect the first information;

sending, using the computing device, the first information to a first information collection service, the first information collection service being a preferred information collection service of the user to collect information associated with the first type of information; and sending, using the computing device, the second information to a second information collection service.

5. The method of claim 4, wherein the sending the first information to the first information collection service is in response to the user selecting to collect the first information.

6. The method of claim 4, wherein the first information includes at least one of a bookmark, an RSS feed, a podcast, a product, an advertisement, a contact, an event, an image, a video, a classified, a document, or a snippet of information.

7. The method of claim 4, wherein the second information includes at least one of information entered by the user and user identification information.

8. The method of claim 4, wherein at least one of the first information or the second information is used to define a profile for the user.

9. The method of claim 4, wherein the user interface is associated with third information, the method further comprising:

identifying a third type of information, the third type of information associated with the third information; and sending the third information to a third information collection service, the third information collection service being another preferred information collection service of the user to collect information associated with the third type of information.

10. The method of claim 4, wherein at least one of the first information or the second information is used to identify an advertisement to present to the user.

11. The method of claim 4, wherein:

the user interface is a first user interface;

the first information or the second information is associated with a third information displayed on a second user interface to be presented to the user; and the third information includes one or more profiles of one or more users, additional metadata or specification or analytics data pertaining to the first information or the second information, or object attributes of one or more objects pertaining to the first information or the second information.

12. The method of claim 4, further comprising:

sending the first information to the second information collection service, wherein sending the first information to the first information collection service includes sending the first information to the first information collection service to be stored in a first database, and sending the first information to the second information collection service includes sending the first information to the second information collection service to be stored in a second database separate from the first database.

13. The method of claim 4, wherein the identifying the second type of information is based on user interaction with the user interface.

14. The apparatus of claim 1, wherein the first information includes at least one of a bookmark, an RSS feed, a podcast, a product, an advertisement, a contact, an event, an image, a video, a classified, a document, or a snippet of information.

15. The apparatus of claim 1, wherein the second information includes at least one of information entered by the user and user identification information.

16. The apparatus of claim 1, wherein at least one of the first information or the second information is used to define a profile for the user.

17. The apparatus of claim 1, wherein the user interface is associated with third information, the apparatus further comprising:

the computing device configured to identify a third type of information, the third type of information associated with the third information; and the computing device configured to send the third information to a third information collection service, the third information collection service being another preferred information collection service of the user to collect information associated with the third type of information.

18. The apparatus of claim 1, wherein:

the user interface is a first user interface;

the first information or the second information is associated with a third information displayed on a second user interface to be presented to the user; and the third information includes one or more profiles of one or more users, additional metadata or specification or analytics data pertaining to the first information or the second information, or object attributes of one or more objects pertaining to the first information or the second information.

19. The apparatus of claim 1, the apparatus further comprising:

the computing device configured to send the first information to the second information collection service, wherein the computing device configured to send the first information to the first information collection service includes sending the first information to the first information collection service to be stored in a first database, and the computing device configured to send the first information to the second information collection service includes sending the first information to the second information collection service to be stored in a second database separate from the first database.

20. The apparatus of claim 1, wherein the identifying the second type of information is based on user interaction with the user interface.

21. A computer program product embodied in a non-transitory computer readable medium, the computer readable medium having stored thereon a sequence of instructions which, when executed by a processor causes the processor to execute a set of acts, the set of acts comprising:

presenting, using a computing device, a user interface to a user on a display, the user interface associated with first information and second information, wherein at least one of the first information or the second information is to be stored in one or more databases;

identifying, using the user interface, a first type of information, the first type of information associated with the first information;

identifying, using the user interface, a second type of information, the second type of information associated with the second information;

receiving a signal indicative of a user selecting to collect the first information;

sending, using the computing device in response to the signal, the first information to a first information collection service, the first information collection service being a preferred information collection service of the user to collect information associated with the first type of information; and sending, using the computing device, the second information to a second information collection service.

22. The computer program product of claim 21, wherein the sending the first information to the first information collection service is in response to the user selecting to collect the first information.

23. The computer program product of claim 21, wherein the first information includes at least one of a bookmark, an RSS feed, a podcast, a product, an advertisement, a contact, an event, an image, a video, a classified, a document, or a snippet of information.

24. The computer program product of claim 21, wherein the second information includes at least one of information entered by the user and user identification information.

25. The computer program product of claim 21, wherein at least one of the first information or the second information is used to define a profile for the user.

26. The computer program product of claim 21, wherein the user interface is associated with third information, the set of acts further comprising:

identifying a third type of information, the third type of information associated with the third information; and sending the third information to a third information collection service, the third information collection service being another preferred information collection service of the user to collect information associated with the third type of information.

27. The computer program product of claim 21, wherein at least one of the first information or the second information is used to identify an advertisement to present to the user.

28. The computer program product of claim 21, wherein:

the user interface is a first user interface;

the first information or the second information is associated with a third information displayed on a second user interface to be presented to the user; and the third information includes one or more profiles of one or more users, additional metadata or specification or analytics data pertaining to the first information or the second information, or object attributes of one or more objects pertaining to the first information or the second information.

29. The computer program product of claim 21, the set of acts further comprising:

sending the first information to the second information collection service, wherein sending the first information to the first information collection service includes sending the first information to the first information collection service to be stored in a first database, and sending the first information to the second information collection service includes sending the first information to the second information collection service to be stored in a second database separate from the first database.

30. The computer program product of claim 21, wherein the identifying the second type of information is based on user interaction with the user interface.

* * * * *